(12) United States Patent
Jaquette

(10) Patent No.: US 8,768,946 B2
(45) Date of Patent: *Jul. 1, 2014

(54) METHODS FOR MANAGING OWNERSHIP OF REDUNDANT DATA

(75) Inventor: Glen A. Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/484,157

(22) Filed: May 30, 2012

(65) Prior Publication Data

US 2012/0239691 A1 Sep. 20, 2012

Related U.S. Application Data

(63) Continuation of application No. 12/893,996, filed on Sep. 29, 2010.

(51) Int. Cl.
*G06F 17/00* (2006.01)

(52) U.S. Cl.
USPC ............................. 707/758; 707/661; 707/781

(58) Field of Classification Search
USPC .......................................... 707/758, 661, 781
See application file for complete search history.

(56) References Cited

U.S. PATENT DOCUMENTS

| | | | |
|---|---|---|---|
| 5,990,810 A | 11/1999 | Williams | |
| 6,209,024 B1 | 3/2001 | Armstrong et al. | |
| 6,339,825 B2 | 1/2002 | Pensak et al. | |
| 6,648,472 B1 | 11/2003 | Mizuochi | |
| 7,110,714 B1 | 9/2006 | Kay et al. | |
| 7,305,386 B2 | 12/2007 | Hinshaw et al. | |
| 7,356,732 B2 | 4/2008 | Rowe et al. | |
| 7,434,015 B2 | 10/2008 | Zhu et al. | |
| 7,519,627 B2 | 4/2009 | Malloy | |
| 7,536,524 B2 | 5/2009 | Shaath et al. | |
| 7,698,517 B2 | 4/2010 | Tulyani | |
| 7,783,596 B2 | 8/2010 | Smolen et al. | |
| 8,095,577 B1 | 1/2012 | Faibish et al. | |
| 8,539,154 B2 | 9/2013 | Jaquette | |
| 8,539,165 B2 | 9/2013 | Jaquette | |
| 8,612,682 B2 | 12/2013 | Jaquette | |

(Continued)

FOREIGN PATENT DOCUMENTS

WO 2007133697 A3 11/2007

OTHER PUBLICATIONS

Final Office Action Summary from U.S. Appl. No. 12/893,987 dated Aug. 2, 2012.

(Continued)

*Primary Examiner* — Rehana Perveen
*Assistant Examiner* — Ttiffany Thuy Bui
(74) *Attorney, Agent, or Firm* — Zilka-Kotab, PC

(57) ABSTRACT

According to one embodiment, a method includes storing instances of a file in a first storage tier and a second storage tier of a storage system; associating each instance of the file on the first and second storage tier with a unique program identifier (UPI); receiving a request to access the file or instance thereof from a user in a group of users; searching for a UPI associated with an instance of the file that exists on the first storage tier; and providing the user requesting access to the file with remote access to the instance of the file on the first storage tier. Additional methods are also presented.

37 Claims, 7 Drawing Sheets

(56) References Cited

U.S. PATENT DOCUMENTS

| | | | |
|---|---|---|---|
| 8,645,636 | B2 | 2/2014 | Jaquette |
| 8,650,361 | B2 | 2/2014 | Jaquette |
| 2002/0010738 | A1 | 1/2002 | Munenaka et al. |
| 2002/0190876 | A1 | 12/2002 | Lai et al. |
| 2003/0110190 | A1 | 6/2003 | Achiwa et al. |
| 2004/0268386 | A1 | 12/2004 | Logan et al. |
| 2005/0131959 | A1 | 6/2005 | Thorman et al. |
| 2007/0107012 | A1 | 5/2007 | Rachamadugu |
| 2007/0160208 | A1 | 7/2007 | MacLean et al. |
| 2007/0185934 | A1 | 8/2007 | Cannon et al. |
| 2007/0220592 | A1 | 9/2007 | Muehlbauer |
| 2007/0243860 | A1 | 10/2007 | Aiello et al. |
| 2007/0266436 | A1 | 11/2007 | Ballard et al. |
| 2008/0005194 | A1 | 1/2008 | Smolen et al. |
| 2008/0052349 | A1 | 2/2008 | Lin |
| 2008/0243958 | A1 | 10/2008 | Prahlad et al. |
| 2008/0244204 | A1 | 10/2008 | Cremelie et al. |
| 2009/0037964 | A1 | 2/2009 | Murray et al. |
| 2009/0132619 | A1 | 5/2009 | Arakawa et al. |
| 2009/0204649 | A1 | 8/2009 | Wong et al. |
| 2009/0204650 | A1 | 8/2009 | Wong et al. |
| 2009/0210913 | A1 | 8/2009 | MacDonald et al. |
| 2009/0216796 | A1 | 8/2009 | Slik et al. |
| 2010/0223274 | A1* | 9/2010 | DeHaan et al. ............ 707/758 |
| 2010/0228624 | A1* | 9/2010 | Morris et al. ............... 707/758 |
| 2010/0228773 | A1* | 9/2010 | Loughery et al. .......... 707/770 |
| 2010/0241595 | A1* | 9/2010 | Felsher ....................... 707/770 |
| 2010/0250531 | A1* | 9/2010 | Andersen et al. ........... 707/736 |
| 2010/0257099 | A1* | 10/2010 | Bonalle et al. ............. 707/770 |
| 2010/0287200 | A1* | 11/2010 | Dhuse ......................... 707/770 |
| 2010/0306257 | A1* | 12/2010 | Levy ........................... 707/770 |
| 2011/0016091 | A1 | 1/2011 | Prahlad et al. |
| 2011/0119293 | A1 | 5/2011 | Taylor et al. |
| 2012/0078931 | A1 | 3/2012 | Jaquette |
| 2012/0079184 | A1 | 3/2012 | Jaquette |
| 2012/0079191 | A1 | 3/2012 | Jaquette |
| 2012/0079192 | A1 | 3/2012 | Jaquette |
| 2012/0079223 | A1 | 3/2012 | Jaquette |
| 2013/0326138 | A1 | 12/2013 | Jaquette |
| 2013/0326144 | A1 | 12/2013 | Jaquette |

OTHER PUBLICATIONS

Final Office Action Summary from U.S. Appl. No. 12/893,968 dated Aug. 3, 2012.
Non-Final Office Action Summary from U.S. Appl. No. 12/893,996 mailed Jun. 27, 2012.
Non-Final Office Action Summary from U.S. Appl. No. 12/893,968 mailed Apr. 11, 2012.
Non-Final Office Summary from U.S. Appl. No. 12/893,987 mailed Apr. 11, 2012.
Written Opinion and Search Report from PCT application No. PCT/EP2011/064282 mailed Oct. 19, 2011.
Final Office Action from U.S. Appl. No. 12/894,022 dated Aug. 22, 2012.
Non-Final Office Action from U.S. Appl. No. 12/893,968 dated Feb. 7, 2013.
Non-Final Office Action from U.S. Appl. No. 12/894,008 dated Apr. 25, 2012.
Cavender, M., "RS-DVR Slides Past its First Obstacle and Gets the Pass for Full Implementation," North Carolina Journal of Law and Technology, vol. 10, Issue 1, Fall 2008, pp. 145-170.
Wei et al., "MAD2: A Scalable High-Throughput Exact Deduplication Approach for Network Backup Services," IEEE, May 2010, pp. 1-14.
"The Green Data Center—A Symantec Green IT Guide," White Paper, Symantec Corp., Apr. 2008, pp. 1-18.
Quinlan et al., "Venti: a new approach to archival storage," Paper, USENIX Association, Berkely, CA., Bell Labs, Lucent Technologies, usenix.org, FAST 2002, Jan. 2-30, 2002, pp. 89-102.
Baud, J.P. et al., "CASTOR Project Status," retrieved on-line at http://wwwinfo.cern.ch/pdp/castor/. ,Feb. 2000, pp. 1-5.
Final Office Action from U.S. Appl. No. 12/893,996 dated Dec. 6, 2012.
Final Office Action from U.S. Appl. No. 12/894,008 dated Nov. 21, 2012.
Advisory Action from U.S. Appl. No. 12/894,022 dated Dec. 31, 2012.
Notice of Allowance and Fee(s) Due from U.S. Appl. No. 12/893,987 dated May 10, 2013.
Notice of Allowance and Fee(s) Due from U.S. Appl. No. 12/893,996 dated Jul. 23, 2013.
Notice of Allowance and Fee(s) Due from U.S. Appl. No. 12/894,008 dated Jul. 31, 2013.
Notice of Allowance and Fee(s) Due from U.S. Appl. No. 12/894,022 dated May 10, 2013.
U.S. Appl. No. 13/961,824, filed Aug. 7, 2013.
U.S. Appl. No. 13/959,630, filed Aug. 5, 2013.
Notice of Allowance and Fee(s) Due from U.S. Appl. No. 12/893,968 dated Sep. 18, 2013.
Notice of Allowance and Fee(s) Due from U.S. Appl. No. 13/961,824 dated Sep. 27, 2013.
Notice of Allowance and Fee(s) Due from U.S. Appl. No. 13/959,630 dated Oct. 11, 2013.

* cited by examiner

METHODS FOR MANAGING OWNERSHIP OF REDUNDANT DATA

RELATED APPLICATIONS

This application is a continuation of copending U.S. patent application Ser. No. 12/893,996, filed Sep. 29, 2010, which is herein incorporated by reference.

CROSS REFERENCE TO RELATED APPLICATIONS

Reference is made to the following U.S. Patent Applications, which are coassigned and filed on Sep. 29, 2010: U.S. patent application entitled "METHODS FOR MANAGING OWNERSHIP OF REDUNDANT DATA AND SYSTEMS THEREOF" having Ser. No. 12/893,987; U.S. patent application entitled "METHODS FOR MANAGING OWNERSHIP OF REDUNDANT DATA AND SYSTEMS THEREOF" having Ser. No. 12/893,968; U.S. patent application entitled "METHODS FOR MANAGING OWNERSHIP OF REDUNDANT DATA AND SYSTEMS THEREOF" having Ser. No. 12/894,008; and U.S. patent application entitled "METHODS FOR MANAGING OWNERSHIP OF REDUNDANT DATA AND SYSTEMS THEREOF" having Ser. No. 12/894,022.

BACKGROUND

The present invention relates to data storage systems, and more particularly, this invention relates to hierarchical or "tiered" storage-based systems capable of being used in high performance, redundant data systems.

Television has become a mainstay of society around the world. The ability to record television programming has proliferated in recent years, and particularly in conjunction with digital video recorders (DVRs) such as TIVO brand DVRs. Typically, a subscriber has one or more DVRs present in his or her home, that allow recording of television programming as it is received from the broadcaster, and playback on demand.

In an effort to improve efficiency and reduce cost, a remote storage digital video recorder (RS-DVR) may be used to store huge amounts of video data on a network site, which would essentially provide the same functionality as a local digital video recorder. Like a local DVR, a user of a RS-DVR programs into the RS-DVR system which programs are to be recorded, and plays the recorded programs back when desired. During playback, the user can use any of the trick modes (e.g., pause, fast forward, fast reverse, etc.), and content providers require support for these trick modes. For example, disk-based streaming systems which store and stream programs from a hard disk drive may require additional processing and storage on the part of the server when trick modes are used, because separate files for fast forward and rewind may need to be stored. The user decides when a recording is to be deleted. The only difference from a user's point of view is that the RS-DVR's storage is physically remote, e.g., it is at the content provider's end of the connection, not at the user's end of the connection, as is the case with conventional local DVRs.

A RS-DVR is a lower cost storage solution for a content provider to maintain versus each user having a local DVR, because it costs less to deploy, administer, and maintain a centralized storage resource, as opposed to a content provider deploying distributed storage at each user's access point (e.g. residence, workplace, mobile hotspots, etc.). It also costs less for specialists to service a centralized Information Technology (I/T) facility than to service multiple local DVRs deployed at user's access points (which can be physically altered and/or damaged by the user).

One issue plaguing the implementation of RS-DVR services is the need to provide fast access to huge amounts of data to multiple users at once. Moreover, regulations in some jurisdictions may require each subscriber to have ownership of his or her own copy of a recorded program, where ownership is some association between the subscriber, device of the subscriber, etc., and a given copy of the recorded program. As apparent, the required data capacity could be astronomical. Implementation of higher speed storage systems, such as hard disk drives, in an RS-DVR work well, but the high cost of an all-disk system makes such systems unaffordable. What is therefore needed is a way to provide a combination of high performance coupled with low storage cost per unit of data.

One approach previously deemed too slow for high performance, high demand systems such as RS-DVRs is storage hierarchical storage management (HSM) systems. Hierarchical storage, with active files on a first tier of storage media (such as hard disk, rewritable optical disk, nonvolatile memory, etc.) and archived files on a second storage tier of less expensive and/or slower-to-access storage media (such as magnetic tape, digital tape, hard disk, optical disk, etc.) is popular for slower data applications for its cost savings, energy savings, etc. A common scheme throughout HSM systems is to use hard disk media for a first storage tier and magnetic tape media for a second storage tier, however any type of media may be used. In some HSM systems, random access storage media, such as hard disk media, is predominantly used in the first tier, while sequential access storage media, such as magnetic tape media, is predominantly used in the second tier. However, traditional HSM systems suffer from several drawbacks which limit their adoption, particularly in high performance systems such as RS-DVRs.

One problem with using standard HSM for a RS-DVR application is that data may need to be moved from the lower, slower tier (e.g. tape) to the higher, faster tier (e.g. disk) very quickly. Standard HSM operation results in too much latency for these high performance environments. For example, when it comes time to access data which has been moved to tape, it can take about 10 seconds to mount the tape cartridge, 15 seconds to load-thread the tape, and 95 seconds or longer to locate the start of the data, which might be located at the farthest end of the tape. In some instances, a worst case read access time of up to about 2 minutes can be encountered, which is unacceptable in high performance environments such as video playback. Since users typically expect that when a program is chosen and "play" is selected, that the program will begin to play expediently, any significant delay to accessing the program is unacceptable to the service provider. The result is that standard HSM systems have heretofore been thought too slow for use in RS-DVR applications.

BRIEF SUMMARY

A method according to one embodiment includes storing instances of a file in a first storage tier and a second storage tier of a storage system; associating each instance of the file on the first and second storage tier with a unique program identifier (UPI); receiving a request to access the file or instance thereof from a user in a group of users; searching for a UPI associated with an instance of the file that exists on the first storage tier; and providing the user requesting access to the file with remote access to the instance of the file on the first storage tier.

A method according to another embodiment includes storing instances of a file in a first storage tier and a second storage tier of a storage system; associating each instance of the file on the first and second storage tier with a unique program identifier (UPI); receiving a request to access the file or instance thereof from a first user in a group of users; and searching for a UPI associated with an instance of the file that exists on the first storage tier. When the instance of the file that exists on the first storage tier is associated with a second user in the group of users and is not being accessed by the second user: setting an ownership status of the instance of the file on the first storage tier to owned by the first user; and setting an ownership status of an unused instance of the file on the second storage tier from owned by the first user to owned by the second user. The first user is provided with remote access to the instance of the file on the first storage tier.

Other aspects and embodiments of the present invention will become apparent from the following detailed description, which, when taken in conjunction with the drawings, illustrate by way of example the principles of the invention.

DETAILED DESCRIPTION

Figure 1:
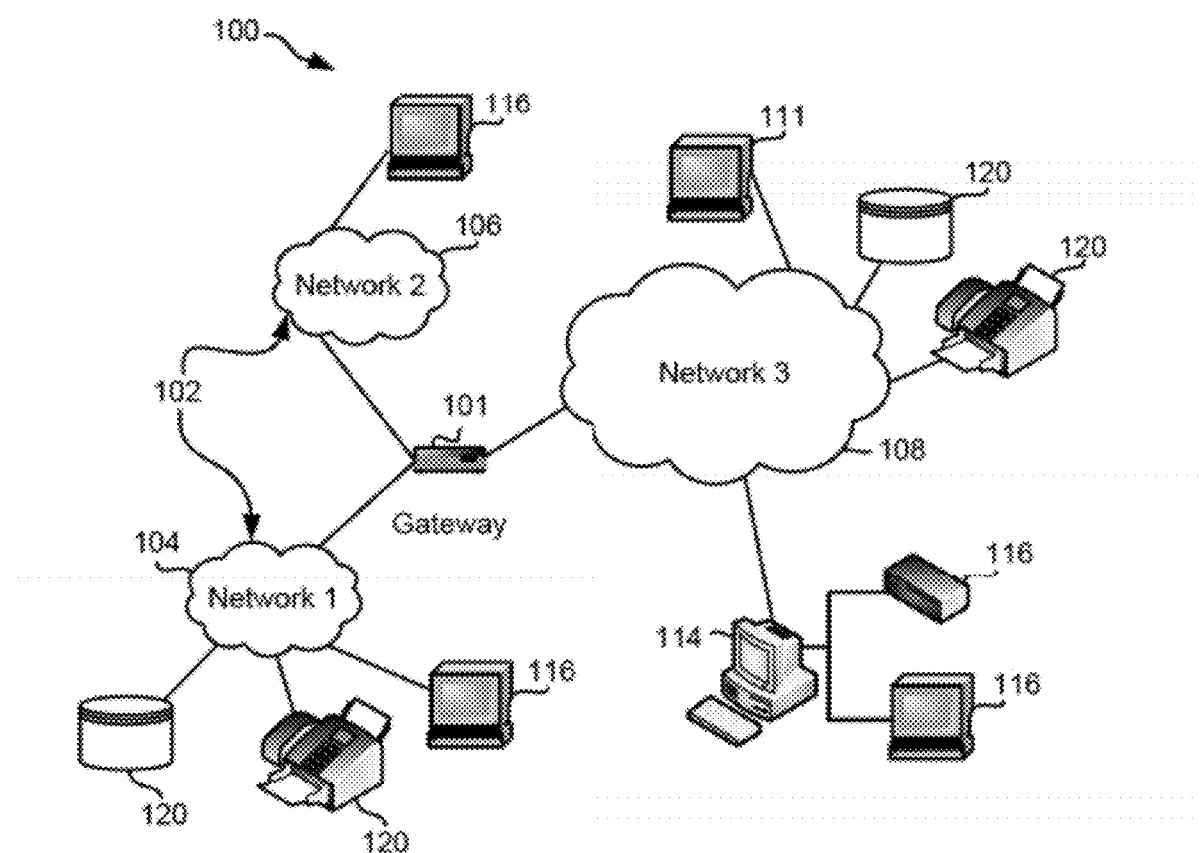
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of hierarchical or "tiered" storage-based systems and use thereof in high performance, highly redundant data systems, as well as operation and/or component parts thereof.

In some HSM systems, where the use of physical tape is acceptable in all regards except access time, there typically is a high degree of data redundancy. This redundancy typically lends itself well to data deduplicated storage, yet in some environments, data deduplicated storage is not allowed, e.g., as in the case where a particular instance of a recorded television program may only be associated with one subscriber. In those environments, there is an opportunity to use physical tape to arrive at a lowest cost point of implementation and use, if the issues with achieving acceptable access times can be overcome.

In some embodiments, in order to address the access time limitations of HSM systems, a series of techniques that allow for use of physical tape in certain high performance, high redundancy environments, such as a remote storage digital video recorder (RS-DVR), are presented. The following illustrative characteristics of these systems are individually and/or collectively novel approaches to solving the access time problem: (1) using deduplicated replication techniques, but only for the pre-migration part of a HSM movement; (2) implementing the deduplicated replication by use of unique identifiers, such as a unique program identifier (UPI), rather than calculating cryptographic hashes to attempt to determine that two files are the same; (3) having file system enforced protection of the unique identifier, which changes the unique identifier to a null value (or identifies it with a flag) if the file data is modified; (4) transferring a file once to an intermediary function, such as LTFS (an acronym which represents Linear Tape File System to some, and Long Term File System to others), and then performing multiple transfers of that file to the next storage tier; (5) breaking a large file into many segments to increase the amount of data that can be moved from one storage tier to a lower performance storage tier; (6) using pointers with access control restrictions to limit the parts of a segment that can be accessed by a given user; and (7) implementing an HSM strategy managed mostly by moving ownership between multiple ownership lists.

It must be noted that various embodiments in the present description may implement the foregoing techniques and characteristics individually or in any combination.

In one general embodiment, a storage system includes a first storage tier; a second storage tier; logic for storing instances of a file in the first storage tier and the second storage tier; logic for associating each instance of the file on the first and second storage tier with a unique program identifier (UPI); logic for receiving a request to access the file or instance thereof from a user in a group of users; logic for searching for a UPI associated with an instance of the file that exists on the first storage tier; and logic for providing the user requesting access to the file with remote access to the instance of the file on the first storage tier.

In another general embodiment, a storage system includes a first storage tier; a second storage tier; logic for storing instances of a file in the first storage tier and the second storage tier; logic for associating each instance of the file on the first and second storage tier with a unique program identifier (UPI); logic for receiving a request to access the file or instance thereof from a first user in a group of users; logic for searching for a UPI associated with an instance of the file that exists on the first storage tier: logic for setting an ownership status of the instance of the file on the first storage tier to owned by the first user when the instance of the file that exists on the first storage tier is associated with a second user in the group of users and is not being accessed by the second user; logic for setting an ownership status of an unused instance of the file on the second storage tier from owned by the first user to owned by the second user when the instance of the file that exists on the first storage tier is associated with the second user in the group of users and is not being accessed by the second user; and logic for providing the first user with remote access to the instance of the file on the first storage tier.

In one general embodiment, a method includes storing instances of a file in a first storage tier and a second storage tier of a storage system; associating each instance of the file on the first and second storage tier with a unique program identifier (UPI); receiving a request to access the file or instance thereof from a user in a group of users; searching for a UPI associated with an instance of the file that exists on the first storage tier; and providing the user requesting access to the file with remote access to the instance of the file on the first storage tier.

In another general embodiment, a method includes storing instances of a file in a first storage tier and a second storage tier of a storage system; associating each instance of the file on the first and second storage tier with a unique program identifier (UPI); receiving a request to access the file or instance thereof from a first user in a group of users; and searching for a UPI associated with an instance of the file that exists on the first storage tier. When the instance of the file that exists on the first storage tier is associated with a second user in the group of users and is not being accessed by the second user: setting an ownership status of the instance of the file on the first storage tier to owned by the first user; and setting an ownership status of an unused instance of the file on the second storage tier from owned by the first user to owned by the second user. The first user is provided with remote access to the instance of the file on the first storage tier.

In one general embodiment, a computer program product for managing a storage system includes a computer readable storage medium having computer readable program code embodied therewith. The computer readable program code includes computer readable program code configured to store instances of a file in a first storage tier and a second storage tier of a storage system; computer readable program code configured to associate each instance of the file on the first and second storage tier with a unique program identifier (UPI); computer readable program code configured to receive a request to access the file or instance thereof from a first user in a group of users; computer readable program code configured to search for a UPI associated with an instance of the file that exists on the first storage tier; computer readable program code configured to set an ownership status of the instance of the file on the first storage tier to owned by the first user when the instance of the file that exists on the first storage tier is associated with a second user in the group of users and is not being accessed by the second user; computer readable program code configured to set an ownership status of an unused instance of the file on the second storage tier from owned by the first user to owned by the second user when the instance of the file that exists on the first storage tier is associated with the second user in the group of users and is not being accessed by the second user; and computer readable program code configured to provide the first user with remote access to the instance of the file on the first storage tier.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a digital versatile disc read-only memory (DVD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. In the context of the present network architecture 100, the networks 104 and 106 may each take any form including, but not limited to a LAN, a WAN such as the Internet, WLAN, PSTN, internal telephone network, etc.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a set top box (STB), digital video recorder (DVR), desktop computer, laptop computer, hand-held computer, printer or any other type of device comprising suitable logic. It should be noted that a user device 111 such as that described above may also be directly or wirelessly coupled to any of the networks, in one embodiment.

A peripheral 120 or series of peripherals 120, e.g. facsimile machines, printers, networked storage units, HSM system, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network. Moreover, user devices may include viewing devices such as televisions, personal computers (PCs), laptops, iPods, iPads, etc. and the like.

Figure 2:
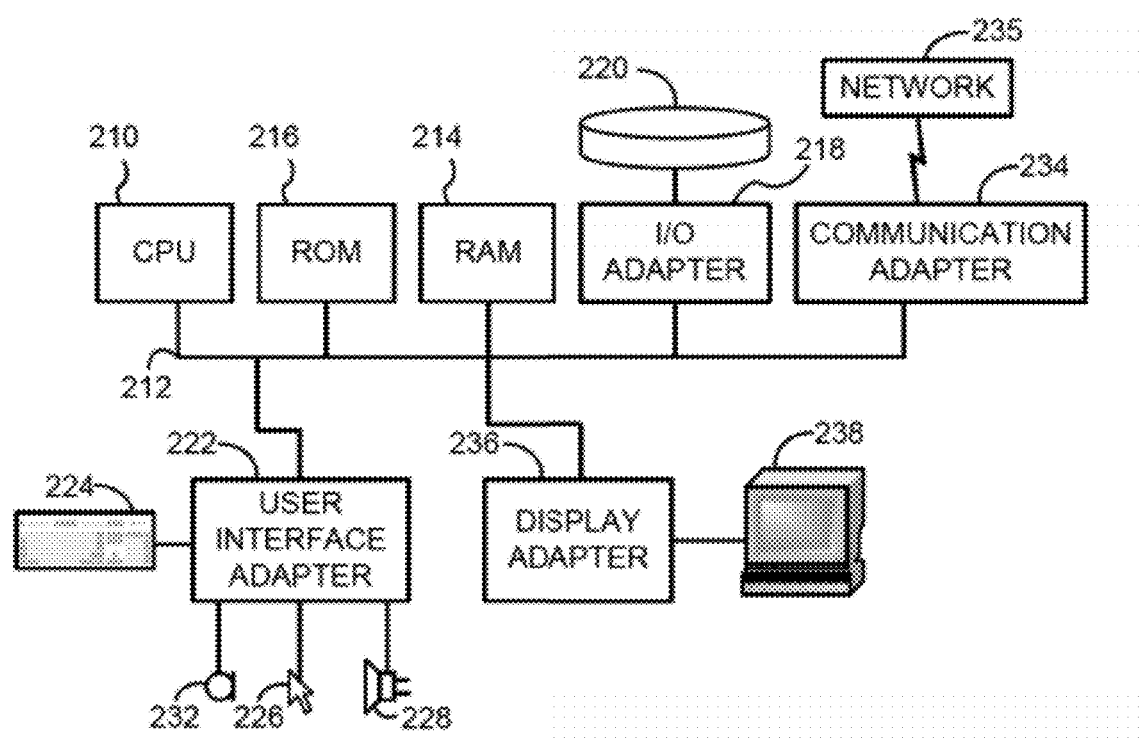
FIG. 2 shows a representative hardware environment that may be associated with the servers and/or clients of FIG. 1, in accordance with one embodiment.

FIG. 2 shows a representative hardware environment associated with a user device 111, 116 and/or server 114 of FIG. 1, in accordance with one embodiment. Such figure illustrates a typical hardware configuration of a workstation having a central processing unit 210, such as a microprocessor, and a number of other units interconnected via a system bus 212. Other devices 111, 116, such as a STB or DVR, may include similar, more, fewer, and/or different components and/or characteristics.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter (interface) 234 for connecting the workstation to a communication network 235 (e.g. a data processing network) and a display adapter 236 for connecting the bus 212 to a display device 238.

The workstation may have resident thereon an operating system such as the Microsoft WINDOWS Operating System (OS), a MAC OS, a UNLX OS, a LINUX OS, etc. It will be appreciated that a preferred embodiment may also be implemented on platforms and operating systems other than those mentioned. A preferred embodiment may be written using JAVA, PERL, C, and/or C++ language, or other programming languages, along with an object oriented programming methodology. Object oriented programming (OOP), which has become increasingly used to develop complex applications, may be used. XML encoding may used for some structures.

In embodiments where the user device 111, 116 and/or server 114 as shown in FIG. 1 is a tape drive or hard disk drive, as shown in FIG. 2, the interface 234 may also provide communication between the drive and a host (integral or external) to send and receive data and for controlling operations of the drive and communicating the status of the drive to the host, as will be understood by those of skill in the art.

Communications components such as input/output or I/O devices (including but not limited to keyboards, displays, pointing devices, etc.) may be coupled to the system either directly or through intervening I/O controllers.

Communications components such as buses, interfaces, network adapters, etc. may also be coupled to the system to enable the data processing system, e.g. host, to become coupled to other data processing systems or remote printers or storage devices through intervening private or public networks. Modems, cable modem and Ethernet cards are just a few of the currently available types of network adapters.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components and/or firmware components.

It will be further appreciated that embodiments of the present invention may be provided in the form of a service deployed on behalf of a customer to offer service on demand.

One or more I/T technologies may be applied to a centralized storage/server solution, such as Redundant Array of Inexpensive Disks (RAID) to provide a more reliable disk storage system, HSM to enable a lower cost (to both acquire and operate) solution, deduplicated storage, and deduplicated replication, according to various embodiments.

Note that any of these I/T techniques can be implemented in multiple new and nonobvious ways. For example, RAID and/or HSM are standard techniques that may be implemented in a manner disclosed herein in an RS-DVR storage solution that may be implemented in various embodiments. Another I/T technique, that may be implemented in various embodiments is deduplicated replication.

As an example, imagine that seven subscribers create recordings of a given program and those recordings are stored in a centralized RS-DVR solution. At first, all recordings are stored on hard disk in a first storage tier of a storage system, and recordings on hard disk are protected by RAID. After those recordings are made, a subset of the recordings which are not actively being viewed are moved to a lower cost storage solution on a second storage tier of the storage system (e.g. physical tape media supporting the first storage tier storage, according to one embodiment) by HSM movement. The data on the second storage tier, such as magnetic tape, may also be protected by redundancy across drives, such as a Redundant Array of Inexpensive Tape (RAIT).

Figure 3:
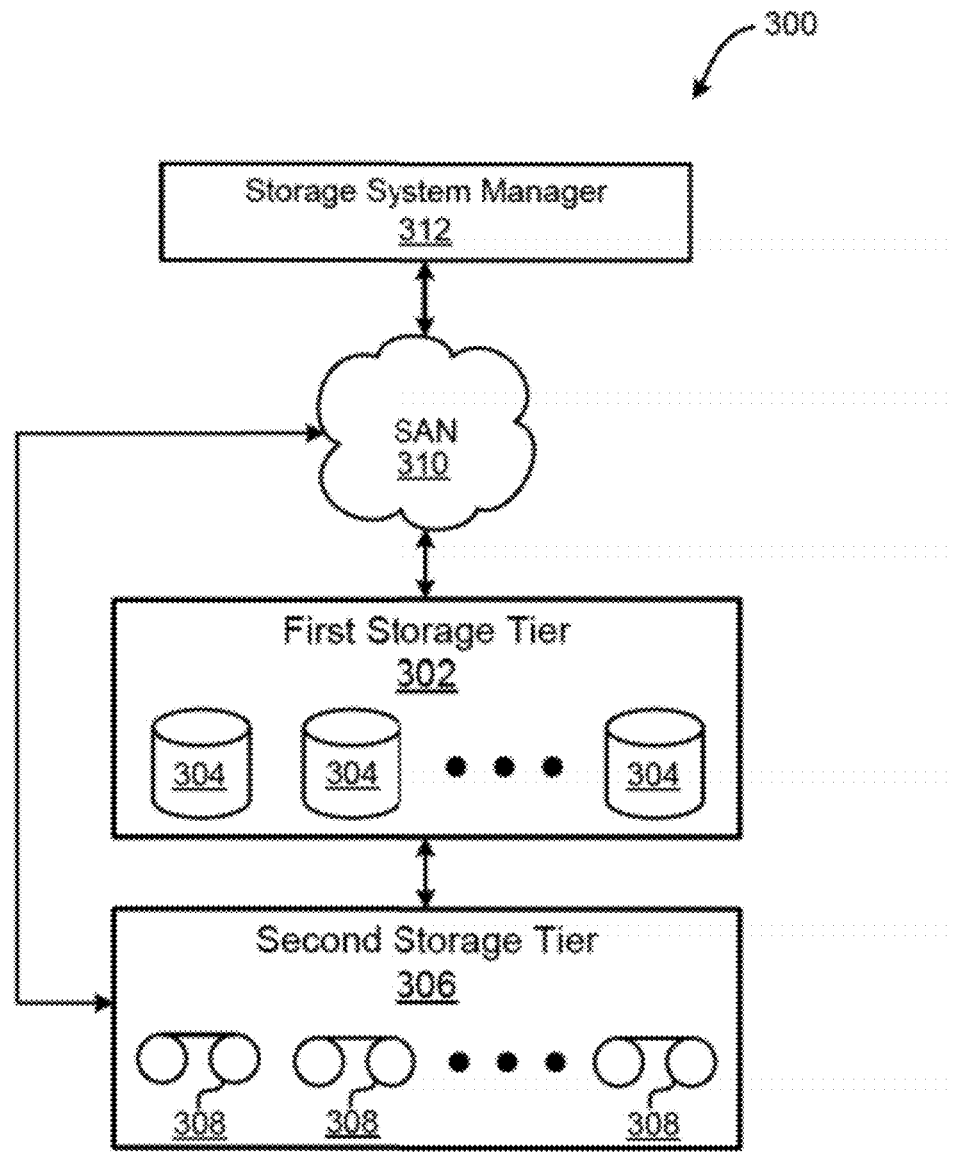
FIG. 3 shows a storage system, according to one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on a first storage tier 302 and a second storage tier 306. The first storage tier 302 preferably may include one or more random access media 304, such as hard disks in hard disk drives. The second storage tier 306 may preferably include one or more sequential access media 308, such as magnetic tape in tape drives. The storage system manager 312 may communicate with the storage media 304, 308 on the first and second storage tiers 302, 306 through a network 310, such as a storage area network, as shown in FIG. 3. Of course, any arrangement of a storage system may be used, as would be apparent to those of skill in the art upon reading the present descriptions.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on a first storage tier 302 and a second storage tier 306. The first storage tier 302 preferably may include one or more random access media 304, such as hard disks in hard disk drives. The second storage tier 306 may preferably include one or more sequential access media 308, such as magnetic tape in tape drives. The storage system manager 312 may communicate with the storage media 304, 308 on the first and second storage tiers 302, 306 through a network 310, such as a storage area network, as shown in FIG. 3. Of course, any arrangement of a storage system may be used, as known to those of skill in the art.

The storage system 300 also includes logic for storing instances of a file or data in the first storage tier 302 and the second storage tier 306, and logic for associating each instance of the file on the first and second storage tier 302, 306 with a unique program identifier (UPI). The UPI may include information regarding the file contents, file creation date, file size, file length, file location, last accessed time for the file, etc. Any information that may be useful to the storage system 300 in using the file and instances thereof that are associated with a UPI may be included in the UPI. The UPI may be an alphanumeric string or any other identifying marker as would be apparent to one of skill in the art upon reading the present descriptions. The storage system 300 also includes logic for receiving a request to access the file or instances thereof from a user in a group of users, logic for searching for a UPI associated with an instance of the file that exists on the first storage tier 302, and logic for providing the user requesting access to the file with remote access to the instance of the file on the first storage tier 302. In this way, since files and instances of files on the first storage tier 302 are more readily accessible and are quicker to queue up to view, providing an instance of the file to the user requesting access from the first storage tier 302 is preferable over providing an instance from another location in the storage system 300, according to one embodiment.

In another embodiment, the file and instances thereof include video data from a broadcast such as a television broadcast, internet broadcast, satellite broadcast, or any other method of delivering content to a user as would be apparent to one of skill in the art upon reading the present descriptions.

In some approaches, a file and instances thereof may include video data from a broadcast from any source, such as a television broadcast, a broadcast across a network (e.g. Internet broadcast), broadcast from an on-demand service (e.g., video on demand), as data received from a content provider, satellite broadcast, or any other method of delivering content to a user as would be apparent to one of skill in the art upon reading the present descriptions. To aid the reader in understanding the concepts, much of the description herein refers to a television broadcast. This has been done by way of example only and the various embodiments may operate in conjunction with any type of broadcast, combination of broadcast types and/or data derived therefrom.

In another approach, the file that exists on the first storage tier 302 may be available to the user requesting access to the file, e.g., not be being used by any other user in the group of users, may not be being accessed by any user, may not be being moved, etc.

In another embodiment, when the file that exists on the first storage tier 302 is associated with a second user in the group of users and is not being accessed by the second user, the storage system 300 may also include logic for setting an ownership status of the instance of the file on the first storage tier 302 to owned by the user requesting access to the file, and logic for setting an ownership status of an unused instance of the file on the second storage tier 306 from owned by the user requesting access to the file to owned by the second user.

In one approach, the UPI may be protected by a file system of the storage system 300 such that any manipulation of data in an instance of the file associated with the UPI causes the UPI to be set to a null value or marked as modified. This ensures that a search for a particular UPI returns only files and instances thereof which include a specific set of data, e.g., the program for which the user is requesting access. For example, multiple instances which are associated to a common UPI include a common collection of data.

In a further embodiment, the storage system may include logic for storing the association of the UPI to each instance of the file in an index. This index may then be used to search for instances of the file which share the UPI associated with the requested file, which makes it easier and quicker to provide access to this instance of the file to the user requesting access, in some embodiments. In another approach, this association may be stored in metadata associated with each instance of the file which shares the UPI, thereby allowing searching of the first storage tier 302 in order to find the UPIs.

In another embodiment, the storage system 300 may include logic for associating each user to a unique user identifier and storing the association in a first index, logic for associating each instance of the file on the storage system 300 to a unique user via the unique user identifiers and storing the association in a second index, and logic for associating each instance of the file on the storage system 300 to one usage status related to usage of the instance of the file and storing the association in a third index. The indices are not shown in FIG. 3, but may be stored in the first storage tier 302 or any other easily accessible storage media. In a further embodiment, the first index, the second index, and the third index may be markup language index files, such as XML files, HTML files, etc.

For the remainder of this description, the first storage tier of a storage system may be described as disk, while the second storage tier of the storage system may be described as tape. Of course, other storage media may be used for either tier, and this is for description purposes only, and in no way limits the applicability of the embodiments provided herein to any particular arrangement of storage media types.

Figure 4:
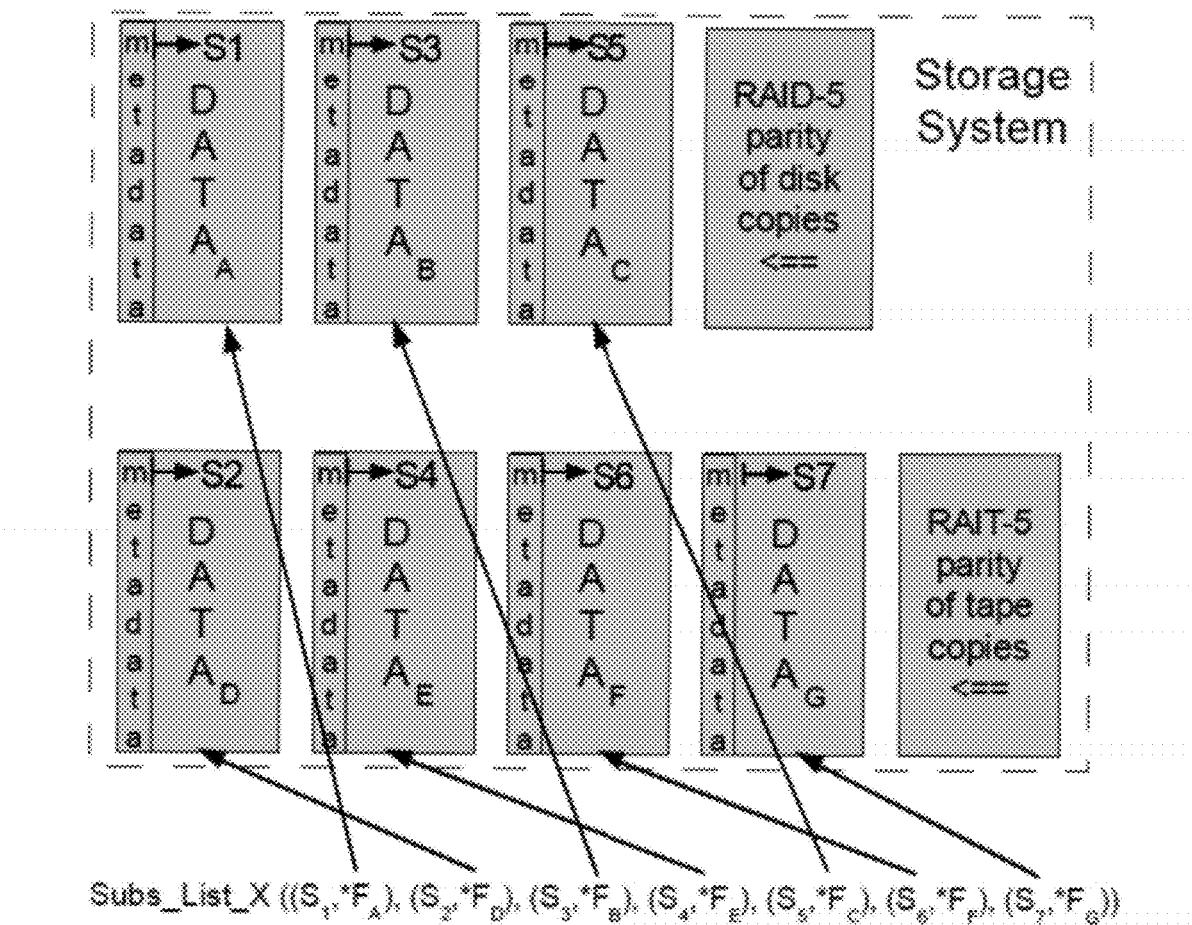
FIG. 4 shows a redundant data protection scheme for a RS-DVR system, according to one embodiment.

FIG. 4 illustrates a RAIT at the highest level, according to one embodiment. First, a list of users who recorded a program (call that program X) is created. In one embodiment, the list of users exists as a data structure in software, and in FIG. 4 is shown as list Subs_List_X. The list includes two pieces of information for each user who recorded program X. First, the list includes a user number which may be used to identify a given user (the user number for the first such user is represented in FIG. 4 as $S_1$). Second, the list includes a pointer to a given stored instance of that recording as a file (the pointer to the first such file is represented in FIG. 4 as $*F_A$). A user number and file pointer pair exists for each user who recorded program X. Each user number in Subs_List_X is thus unique and represents a different user. Additionally, each file pointer in Subs_List_X is unique, meaning that each of those users 'owns' a unique instance of the recording. In a preferred embodiment, this functionality may be provided without any additional licensing from content providers.

FIG. 4 also illustrates that there may be two parts to a file, the data in the file, and the metadata associated with that file. Typically a file system maintains the file in two pieces: data extents written to the storage media (e.g., magnetic disk, magnetic tape, etc.) and the file metadata kept in a file index table of some sort, e.g., as described below. The index table is typically also stored to the storage media, and a second copy of it is typically kept in server memory for fast access, such as RAM, Flash, etc.

Figure 5:
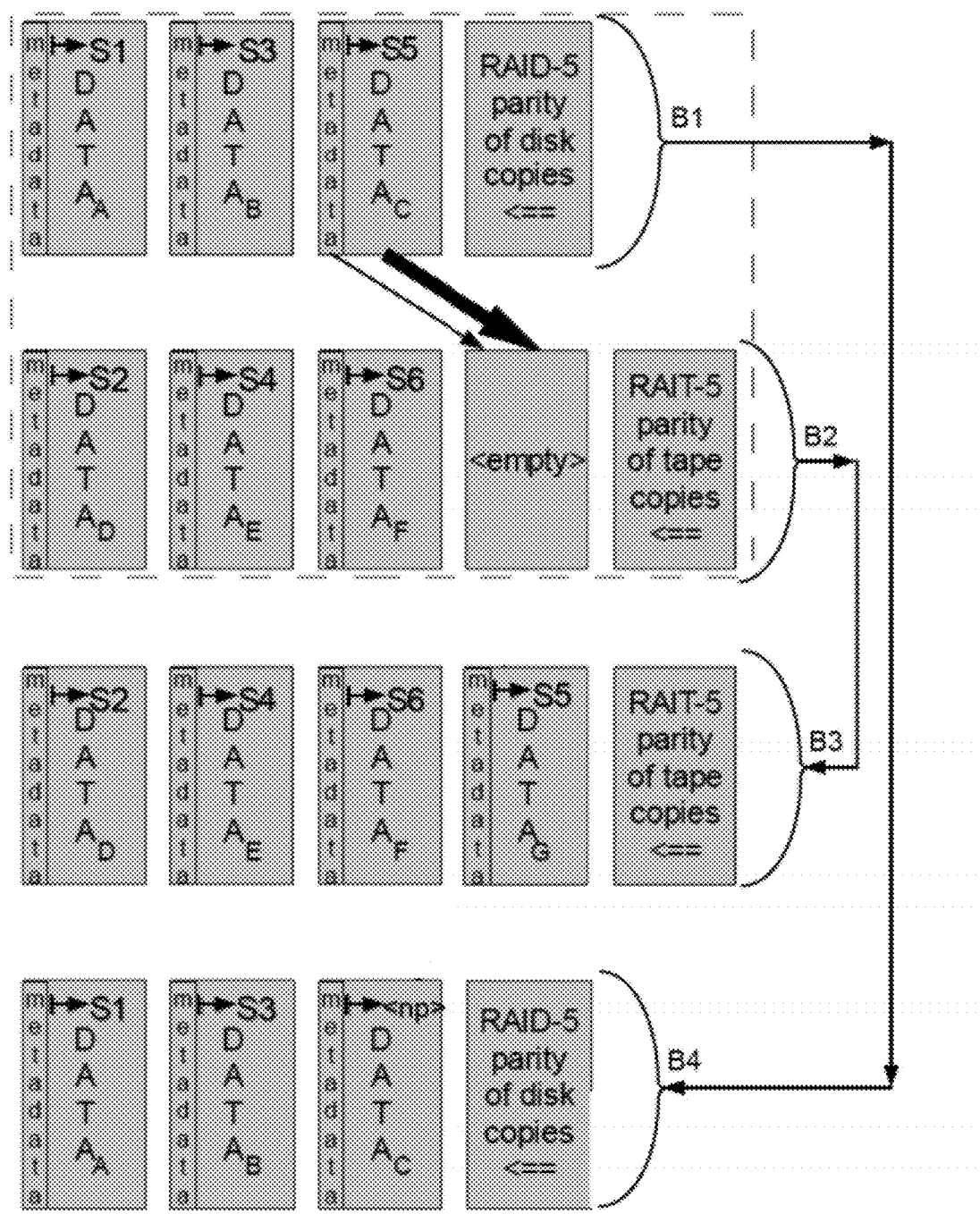
FIG. 5 shows HSM movement to a second storage tier including data and metadata, according to one embodiment.

Referring now to FIG. 5, assume that only six users recorded the program, and the storage system wants to move the fifth user's copy to tape using the HSM. Rows B1 and B2 represent the recordings stored to disk and tape, respectively, before the HSM movement. The HSM movement begins by moving the data and associated file metadata to tape in two separate steps (those two steps could in principle be performed in either order), which essentially performs the pre-migration copy part of the HSM movement.

Row B3 shows the recordings stored to tape after the pre-migration. In Step 3 the RAIT-5 parity is recalculated to include the new file. In Step 4, the source copy of the pre-migration copy is released, essentially making the transfer a migration. What had been the source copy of the recording is no longer associated with any given user, and so may be overwritten or alternately used as a spare. One embodiment stores user numbers in the file metadata, in which case releasing the file means changing file metadata. If so, then the RAID-5 parity may be recalculated to reflect any changes made to files storing those recordings to disk. But since only the metadata actually changed, it is likely that the only RAID-5 calculation update needed is to reflect updates to the file index. A second embodiment tracks ownership changes, which are tracked through Subs_List_X, and that is the only data structure that has to be changed. That data structure may be kept in both memory and on disk, enabling fast random access performance update of RAID parity calculated across that structure. If the 'freed' disk space is then overwritten, then the Data area may be changed and RAID parity across that recalculated. With either option, there may be no need to change RAID calculated across the Data part of that recording unless that Data area is actually changed by erasure or overwrite. B4 shows the recordings stored to disk after the migration is complete.

Figure 6:
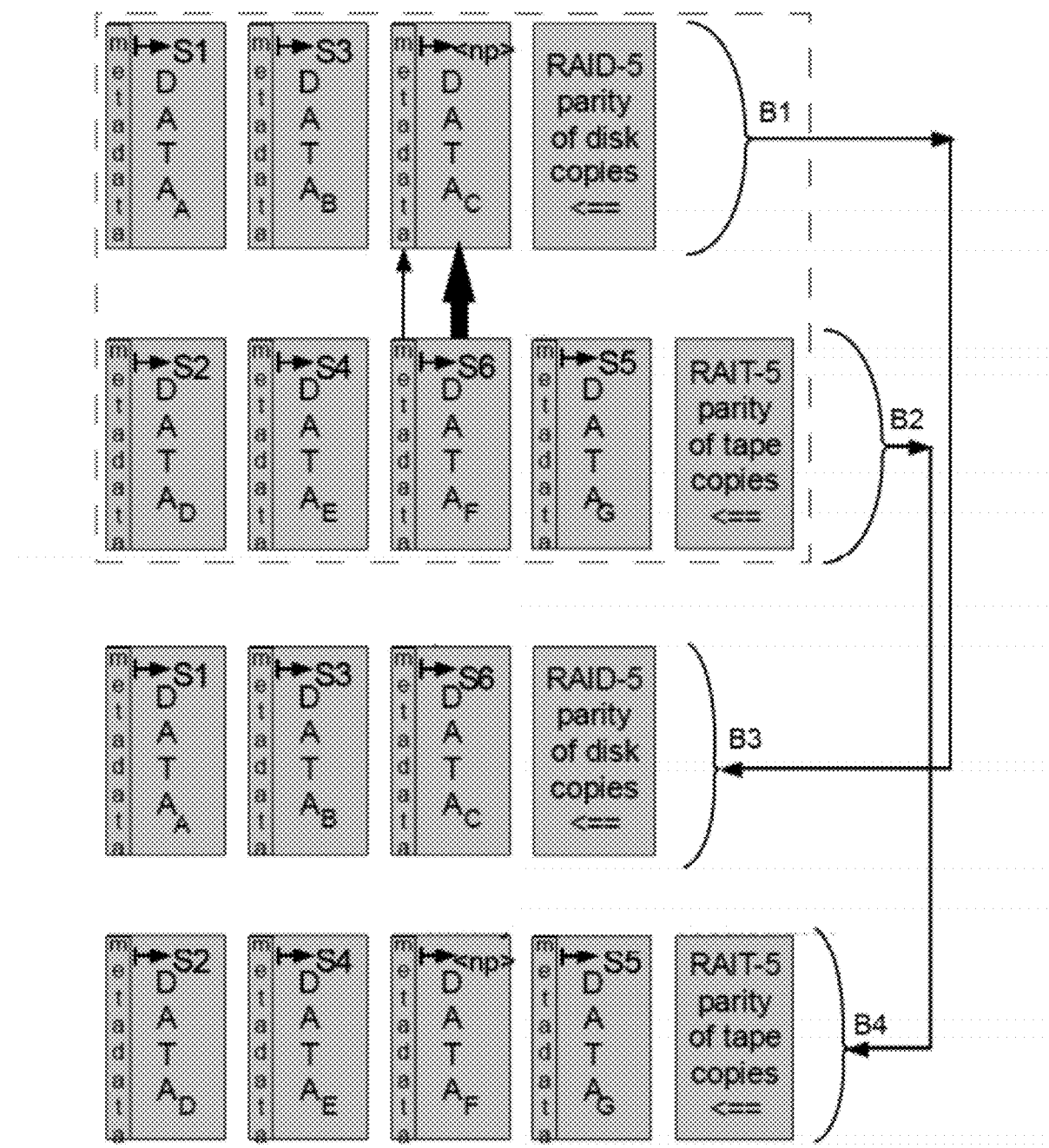
FIG. 6 shows "data-less" file movement from a second storage tier to a first storage tier, according to one embodiment.

Referring now to FIG. 6, six users recorded a program and the storage system wants to move, using HSM, the sixth user's copy from tape to disk. Rows B1 and B2 represent the recordings stored to disk and tape, respectively, before the HSM movement. The HSM movement would typically begin by moving the data and associated file metadata to disk in two steps to perform the pre-migration copy part of the HSM movement. These operations are indicated by the thick and thin arrows, respectively, between $DATA_F$ and $DATA_C$. Note, however, that these copies of data and metadata only involve actual data movement when absolutely necessary. As will be described below, deduplicated replication techniques first make an assessment of whether the data being transferred is already at the destination. If so, there is no need to transfer it. In the case depicted, the data part of the file was in fact already present, because it represented an identical copy of that data when the fifth user's recording was on disk. But, as shown in FIG. 5, the fifth user's recording was migrated to tape and the copy on disk had been released. Hence, the data on disk was orphaned (e.g. is unused), and is now available for adoption. Since the same data that is to be potentially moved as part of Step 1 in FIG. 6 already exists at the destination, it would be wasteful to transfer it there. Note that Row B3 shows the recordings stored to disk after the pre-migration.

In Step 3, the RAID-5 parity is recalculated to include the new file. This may only be necessary if the first option is implemented (track user number in file metadata), and if so, a change to the RAID-5 parity across the file index is perhaps the only change made. If the second option (track user number in Subs_List_X only) is implemented, then an update to the Subs_List_X data structure in memory and on disk is made. In Step 4, the source copy of the pre-migration copy is released, essentially making the transition from pre-migrated to migrated, so the file has been moved (i.e. there are not two file copies of that user's recording, only one). What had been the source copy of the recording is no longer associated with any given user, and so may be overwritten or designated as a spare so that it may then be reused. Note that the same two options at the source are available: to update the file metadata (and if so, to update the file index and any parity across it) or to update only a list which tracks these changes. In one embodiment, a single Sub_List_X that is being used to track both disk and tape copies may be used, as shown in FIG. 4. Or, in another embodiment, two separate lists may be kept, one for copies on disk and another for copies on tape. Note that there is no need to change RAIT calculated across the data part of that recording unless that was actually changed by erasure or overwrite. B4 shows the recordings stored to tape after the migration is complete.

Referring again to FIG. 6, a "data-less" file movement from tape to disk is shown, which allows a user to get access to a requested recording quickly. That is, it could be that neither of the two potential movements shown is actually necessary, as in the case in the situation pictured. Only the data structure tracking which recording instance is owned by which user is updated and this update is made in memory and on disk, both of which allow for very rapid random access (e.g. sub-second). If user ownership had been tracked by file metadata stored to tape, then the file index on tape would have to be updated and this would limit how quickly the file movement could be completed—it would likely take at least 30 seconds. Thus, a significant advantage is achieved when that file ownership is tracked by a data structure such as Subs_List_X in FIG. 4 and not via file metadata stored to tape. Note that the same or similar principles may be applied to provide for "data-less" file movement from disk to tape. For example, if instead of "<empty>" in the fourth box of row B2 in FIG. 5, there was "Data" associated with a recording of the same program, which was not presently 'owned' by a given user, meaning it had been orphaned, then Step 1 (transfer of Data) may be skipped which modifies the file movement depicted in FIG. 5 such that it is a "data-less" transfer.

One benefit of various embodiments of the present invention is that they may take advantage of existing technology for portions of their implementation. A brief description of various technologies which may be implemented in some embodiments is presented below. The "data," "data object," etc., referenced herein may refer to a file or portion thereof or an instance of a file or an instance of a portion of a file used in a RS-DVR system according to some embodiments. Similarly, an "instance" as used herein may refer to an instance of the file, an instance of a portion of a file, an instance having the file plus more data, etc. Thus, for example, an instance may be a copy, replication, or duplicate of the file, the file itself, a migration of the file, the file stored in a particular storage system or stored using a particular technique, etc. In a RS-DVR system, a file may include data representing a television or other program content that may be generated from a television broadcast, network (e.g. Internet) source, on-demand service, as data received from a content provider, etc.

RAID techniques are broadly used in the I/T industry for both performance and reliability reasons. In a RAID, striping refers to writing (or reading) some data entity across multiple disks simultaneously to get higher performance—essentially the sum of the performance of the individual disks being striped. According to one embodiment, the RAID employed in the system may utilize striping and/or any other RAID technique known in the art.

In a RAID, error correction refers to a practice whereby redundant ("parity") data are stored to allow problems to be detected and possibly fixed (known as error correction or fault tolerance).

In a RAID, mirroring refers to writing identical data to two hard disk drives (HDDs) instead of one, and is the simplest form of redundancy. Mirroring is used to achieve high availability (HA) in servers (e.g. data is written to both disks, and second disk is read from if the first disk fails).

In one embodiment, including RAID configurations using RAID-1 mirroring and RAID-5 striping, relying on the redundancy, loss of any one failed disk may be tolerated. The simplest form of RAID-5 is calculation via simple XOR which if applied across an odd set of identical inputs (data) will result in one more replica of the identical data.

HSM techniques are broadly used in the I/T industry for cost reasons. HSM is based on a storage hierarchy, e.g. having tiers of storage separated by access and/or costs associated with each tier. Simply put, the fastest storage (e.g. SRAM) is the most expensive. The next fastest storage (e.g. DRAM) is somewhat cheaper than SRAM, but much higher performing than even fast Fibre Channel (FC) disk, but much more expensive than magnetic disk. FC disk in turn is much higher performing than lower cost disk such as SATA, but much more expensive as well. And SATA is much higher performing (from a random access point of view) than tape, but it is much more expensive as well. For some data, it is important that the data be kept in very high performance silicon storage like SRAM and so the need justifies the additional cost. But for most data, there is no valid business reason for the data to be on expensive storage—e.g. it is relatively infrequently accessed and when it is accessed, some read access latency is acceptable. For example, storing data on near-line tape, i.e. in an automated tape library (ATL), may be completely adequate. For most customers, no single tier of storage is typically adequate. However, keeping all their data on the very high performance storage, when only a small subset of their data really requires high performance storage, is cost prohibitive. Similarly, keeping all their data in a more affordable storage solution which has adequate performance for most of their data, but not all of their data, is also unacceptable because it is not adequate from a performance point of view for some subset of their data.

So, a tradeoff may be made between high performance and low cost storage solutions, with some of the data being kept for a time on high performance, high cost storage. But the data that is kept in that premium storage changes over time, in most applications. Some data which once had to be kept on high performance storage may fall into relative disuse to the point that it is now tolerable, and cost advantageous, for it to be moved to lower performing, lower cost storage. The simple fact is that it is most economical to implement a system which provides only adequate performance and storage of their data. Therefore, general practice techniques dictate minimizing the amount of data at each of the more expensive, higher performing storage tiers, and pushing it to the lower cost, lower performing storage tiers. Therefore, cost effective storage solutions may apply HSM techniques extensively. Accordingly, various embodiments may employ HSM of any type, including those disclosed herein.

According to one embodiment, caching may be used, which stores data to a high performance (and thus high cost) storage tier for very rapid access. There are multiple forms of caching. First, "flow-through" caching such as a First In First Out (FIFO) buffer writes the most recently received data into the buffer, effectively overwriting the oldest data in buffer which has been released for overwrite. In this case, the caching policy is strictly based on when received, with the highest priority given to the most recently received data. That said, a FIFO is typically managed so that older data is not lost if it hasn't yet been read out of the FIFO's output. Some form of handshaking is typically used on the FIFO's output to assure that this output data is received at its destination before permitting it to be overwritten. Once the output of the FIFO reception is confirmed, the location holding that output data is released and may be overwritten. Depending on how the FIFO is implemented, data which is released might not be overwritten for some time. For example, if it is managed as a circular buffer, older data won't be overwritten until enough data has been received since writing began to wrap around and overwrite it. One use for FIFOs is to speed match interfaces between asynchronous (or synchronous but independently gated) clock domains.

Volatile caching is data storage that is not protected against power loss. Said differently, power loss of sufficient duration will result in data loss of data which is stored in volatile storage. Non-volatile caching is data storage that is protected against power loss. Said differently, once stored in truly non-volatile storage, power loss of even indefinite duration (e.g. a year or more) does not result in loss of data which is stored in non-volatile storage. Examples of volatile and non-volatile storage are well known in the art and may be employed in some embodiments.

Write caching is used as a high performance temporary storage location during a write operation until the data may be written to the next level of storage. This is typically done when the latency of writing to the next level of storage directly is sub-optimally slow due to write latency. Write caching is sometimes managed in a similar manner as FIFO. Most modern non-volatile storage boxes, whether solid-state drives, disk drives (or arrays), or tape drives, have some form of write caching. In some cases, the volatility of write caching to DRAM is recognized by the application. For example, when writing to tape, a standard assumption in some approaches is that nothing written to the tape drive is actually non-volatilely stored on magnetic tape until the drive is forced to "synchronize," which means forced to write to non-volatile storage. In other cases, like when writing to disk, the assumption may be the opposite—that is when the drive responds that it has successfully written the data, the writing application is assuming it is stored permanently (i.e. non-volatilely). That said, the vast majority of high performance disk systems do perform write caching to volatile storage internal to their system (i.e. inside the disk drive or array assembly), without the using application having knowledge of it (i.e. transparently). These disk systems may with this scheme because they have essentially made a non-volatile system solution which uses the volatile memory, e.g. DRAM, but additionally uses other technologies (e.g. battery backup to allow writing to flash or dumping to disk in the event of power loss). Some write caching is essentially "flow-through" but some devices allow select data to be held "pinned" in cache, and accessible during a read operation, long after data received before or after it has flowed out of the cache.

Read caching is used as a high performance temporary storage location of data read from the next slower level of storage when the latency of reading from the next level of storage directly is sub-optimally slow due to access time. Most modern non-volatile storage systems, such as disk drives (or arrays), or even tape drives, have some form of read caching. Note that read caches are often explicitly volatile—in the event of power loss, any data access is essentially directed to start at the slower storage behind the now-assumed-to-be-empty read cache, even if that read data must then flow through that read cache. There are different read cache policies employed in different systems. The most basic form of read caching for block or file storage is to keep as much of the most recently accessed data as possible in read cache. Metrics are kept of when was the last time (or how frequently) a certain block (or file, depending on storage type) of data was accessed—in that case, when new storage space is needed in read cache, the Least Recently Used (or alternately the Least Frequently Used) data is freed and allowed to be overwritten. This strategy keeps all of the most recently accessed data, that will fit, in the read cache.

Data copying and movement includes moving data from one storage tier to another. Sometimes there are multiple tiers of storage. In one embodiment, a system comprises a highest performance storage tier, which might include DRAM (e.g. as part of a read or write cache), a next highest performance storage tier which might include FC disk, and a lower performance storage tier which might include SATA disk. There may be additional tiers to even slower access media, e.g. near-line storage (tape in an ATL). HSM may be performed either internal to a storage system or by software external to the storage systems, in some approaches.

In one embodiment, data movement may occur in two distinct phases: pre-migration and migration. First, pre-migration is copying the data to the next storage tier, in one approach. When a set of data has been pre-migrated, a complete copy of it is present at both the initial source tier and at the destination tier. Pre-migrated data has been copied. Second, migration occurs when the copy at the initial source tier is released for overwrite and/or overwritten so that the only copy that remains registered in the system is the one on the next level of performance storage, which is to say the destination copy of the data that had been created by pre-migration, in one approach. When data migration is complete, the data has essentially been moved.

In a preferred embodiment, a storage system comprises two main storage tiers. The first storage tier includes random access media disk storage, such as a disk array which may be RAID protected or not, just a bunch of disks (JBOD) or not, etc., which may use SATA HDDs and may include caching at both the disk array level and in the HDDs. The second storage tier may include sequential access media, such as physical tape drives and may utilize flow-through caching in the tape drives. The second storage tier additionally may include a vehicle to tape, such as TSM or LTFS.

According to one embodiment, once a file has been pre-migrated to the destination, the list or index which tracks which instance of a recording belongs to which user may be updated to point to the destination copy created by the pre-migration. Additionally, the original user no longer "owns" or is associated with the source copy, in one approach. From the original user's "ownership" perspective, the recording has been moved. The previous instance may thus be released for (1) erasure, (2) overwrite (e.g. with a new recording), or (3) for some other user to take ownership over, in some approaches.

Typically with HSM, upon changing a given data entity (e.g. a file) from pre-migrated to migrated, the previous instance of the file (the source of the pre-migration copy) is released for overwrite. That said, it could be erased, but that takes real storage system bandwidth, and this is typically not necessary. Another option is to allow some other user to take ownership of it, in a preferred approach, for example, as part of a deduplicated replication performed to do HSM pre-migration of another user's recording.

When one deletes a file in a standard disk file system, like NTFS, a row in the Master File Table (MFT) is deleted, which eliminates all the metadata associated with that file including the pointer to the data written elsewhere on disk. The data itself is not proactively erased or overwritten. Instead the sectors that contain the data are returned to the pool of available sectors, so that they may potentially be overwritten in the future (e.g. by a new file). Whether it is actually overwritten in the future is completely dependent on whether that disk space is used in the future. It might not ever be overwritten. However, proactive overwriting of data may be employed, where desired in an embodiment.

Deduplicated replication (i.e. deduplication) may be employed in various embodiments as a bandwidth efficient method of performing replication. Replication, in one approach, is the process by which a data object (which could be a file, a LUN, a volume, an extent, etc.) is copied. A replication function is given some handle for a source object, and also directed as to where a copy of the object is desired—i.e. the destination. The replication function then makes the copy of the source object at the destination. Deduplicated replication does a similar thing, except potentially with much less bandwidth. Rather, it is looking to see whether any data within that object already exists at the destination end. If so, there is no need to transfer all of the data to the destination. Instead, only the missing (e.g. overwritten) portions of the object on the destination are transferred to the destination, thereby saving bandwidth.

A common concept in deduplicated replication is consistent throughout, although it has multiple methods of implementation. According to one embodiment, deduplicated replication comprises determining whether data exists at the far end, before commencing the transfer operation. Methods for performing such a check include: (1) hash-based, (2) feature-based, and (3) file-based, according to some approaches. Other known techniques may also be used.

In one embodiment, hash-based deduplicated replication utilizes cryptographic checksums to indicate a match. A long and strong cryptographic checksum, such as SHA-256, provides a very strong one-way function, e.g. if two data points are identical, then when processed they will yield the same SHA-256 calculations. On the other hand, if two data points (one at the source, and one at the destination), when processed, result in the same SHA-256 calculation, then the probability of them being anything other than an exact match is so exceptionally small as to be of no practical concern. Sometimes, other additional checks, such as checking that the data are of the same length, are additionally used to provide additional confidence that two data which calculate to the same hash are in fact identical.

In another embodiment, feature-based deduplicated replication techniques analyze data features with a sliding window and determine the probability of a match. These systems may only find a match after confirming identity via a bandwidth-intensive bit for bit comparison, which may not be desired for high performance systems.

In one preferred embodiment, it is desirable to modify this technique and enable deduplicated replication to a remote site to meet bandwidth constraints and avoid latency on the connection between the two sites. In this embodiment, one may determine that data are the same with high, but not absolute accuracy. For example, a very strong checksum may be calculated across a source object (e.g. a file). A deduplicated replication of that object may then proceed, going with the assumption that anything that appears very likely (though not certain) to be a matching data point is in fact a matching data point. Once a full dataset occupies the destination end, the system may then check the assumptions by calculating a strong checksum across the whole dataset at the far end. If that calculation matches the calculation of the same strong checksum at the source end, this indicates successful deduplicated replication of the data in the destination end exactly as it existed at the source end.

In yet another embodiment, file-based deduplicated replication looks for full files to match, and does not attempt to find matching subsets of data. In the case of file-based deduplication, a checksum or hash may be calculated across the whole file. File-based deduplication may also check that any two suspected matching files are also of exactly the same length. Alternatively, a file name may also be used as a clue of a potential match; however, files may be renamed without changing the data contents of that file. This is true not only for file name, but also for any metadata associated with a file. For example, two files might have identical data content (e.g. referring to the data stored on disk, which are pointed to by the file system's index table (e.g. DOS's FAT, NTFS's MFT, LTFS's index, etc.). Much of the metadata of a file, however, (including the file name and most. Extended Attributes, but not the length) might be completely different, which means that a lot of the file metadata cannot be used to indicate a match.

Once established by any of the deduplicated replication techniques discussed above, associating the data with one or more data objects may be accomplished in several ways.

According to one embodiment, association includes creating a copy of the file by creating a second pointer to the pre-existing data (i.e. the deduplicated storage technique).

In another embodiment, association includes creating a new instance of the data at the destination by copying from the existing instance at the destination to create another, new instance, which may have performance advantages over copying from the source, especially if the new instance can be created when copying within a local storage system.

In a preferred embodiment, in systems where a "spare" copy is available, association includes "adopting" an unassociated, or "orphaned" data at the destination, e.g. either the data is not pointed to by any file metadata (in the first option), or it is not pointed to by the Subs_List_X (in the second option). Adopting orphan data is preferable to creating a new local copy as it requires no data copying/movement. Only the new metadata and pointers have to be put in place, which conserves bandwidth and processing capacity.

In some embodiments (like in the RS-DVR case), data identity need not be calculated mathematically as described above. For example, a unique program identifier (UPI) may be generated which may be associated with a collection of certain data. That UPI could be kept with any instance of that recording—e.g. as an extended attribute of that file. This provides a very convenient way to find out that two files, of potentially different names (or different in some other piece of metadata) do in fact contain identical data, while conserving computational resources and reducing compute time compared to calculating hashes or checksums, or performing bit-for-bit comparisons.

In another embodiment, the UPI (extended) attribute is protected by the file system such that any manipulation of the data in the file would cause that UPI to be set to a null value. That is, the file system preserves the association of that UPI with a given set of data by destroying the UPI if the data is changed. For example, this may be accomplished via use of a file system (e.g. LTFS in the case of tape). In another embodiment, the UPI may be set to any other value which indicates a change has occurred to the underlying data.

In several embodiments, deduplicated replication in a centralized RS-DVR storage solution may enable very fast pre-migration of data awaiting HSM from one tier of storage to another. It could also be used to premigrate data on disk to tape in another embodiment. Or it may be used to pre-migrate data on tape to disk. Other uses may also be apparent to one of skill in the art.

According to one embodiment, pre-migration is just the first step in HSM movement. The second step is to release the data in the source tier, after which time data migration is complete. The net effect when deduplicated replication is being performed as part of a HSM is, when seen macroscopically, that it results in moving, rather than copying, data. There is a transient copy being made as part of pre-migration, but once the source is released, the destination has the sole instance of that data file—so it has truly been moved, not copied. In instances where "atomic swapping" is used (possibly because spare copies are not available), ownership of a first data file is transferred from a first user to a second user. Therefore, in these instances, there is no actual data movement, there is only a transfer of ownership from one data file to another data file. This "atomic swapping" may be achieved by maintaining two lists, one with the ownership as it originally is, and another list with the ownership swapped, thereby providing access to the desired data file. In order to execute the "atomic swap," a pointer is switched from pointing at the first list to the pointing at the second list, thereby providing instantaneous swapping of ownership, in one embodiment. Note that the "atomic swap" technique may also be used after premigrated copies are created to complete a migration, in which case, at the completion of that "atomic swap," the disk copies are abandoned (not orphaned, but irretrievably freed for overwrite).

There is a desire to migrate a different user Y's recording which is presently on tape to disk, in one example. If HSM is used, then the operation comprises two standard steps. First, pre-migrate the data from tape to disk by deduplicated replication. In this case, the deduplicated replication routine identifies that there, actually already is an unassociated, or "orphaned," copy of that same recording on disk. The system completes the "copy" by transferring the metadata from the source and associating it with the orphaned data by changing the structure which tracks file ownership to associate the user's ID from the data at the source to that data at the destination. That change essentially adopts the data at the target location, so that it is no longer orphaned—and is thus no longer available for further assignment or overwrite. Second, the migration to disk is completed by releasing the source copy on tape.

Releasing the copy on tape essentially "orphans" that data. This orphaning may occur in several ways. In a first example, that file may be deleted by removing the file from the index stored to the tape, but this may take 30 seconds or more. Another example is to have ownership tracked by one or more external data structures. In that case, a file could be released very quickly (in less than a second). In one approach, another index may be created, called Orphan_List_X for example, which tracks the freed recordings of X. In this case, the releasing of the copy on tape involves removing the entry from Subs_List_X and adding an entry in Orphan_List_X. Steps 1 and 2 may be accomplished very rapidly (e.g. in less than a second), which is a benefit of this technique.

In one embodiment, orphaned copies of data may be used as part of deduplicated replication performed as part of pre-migration. Meanwhile, in a preferred embodiment, open and systematic usage of copies may be enabled.

For example, if twelve HDDs comprise a system and RAID-5 provides at least 1/11=9% overhead for RAID, then in one instance where 10,000 users record a given show, RAID-5 would require 9%×10,000, or 900 HDDs for use as data protection. One embodiment of the present invention may achieve about equivalent protection from a system storing 10,020 copies of the data to disk (one copy for each user who recorded it and 20 spares). Additionally, spares are available for reassignment to replace any of the 10,000 HDDs holding users recordings. Such a preferred embodiment may produce 0.2% overhead instead of 8%, reducing the overhead for redundancy by a factor of 40.

In one embodiment, a file may be moved from tape to disk very quickly by using deduplicated replication and only updating data structures on disk. This relies on finding an orphaned copy of the data on disk, which is data that had been released and made available for overwrite. However, in another embodiment, assigning orphaned data to spare copies of that recording, or irrevocably releasing the orphaned data for overwrite would allow for much more systematic usage. The pool of spares may be managed down to the proper size for use in both replacing recordings that were on HDDs that have failed, and as the destination of a pre-migration as part of a "data-less" file move, in one approach. Dealing with spare copies more openly is simpler, cleaner, more efficient, and less error prone.

Any method for migrating data between tape and disk may be used with the embodiments described herein. In one such embodiment which uses IBM's TSM, iDataplex data may be sent to one of TSM's APIs (Backup, Archive, or HSM) with the TSM HSM API preferred.

An alternative embodiment to TSM may use the Long Term File System (LTFS), which is a true file system for tape. LTFS presents a standard POSIX interface (e.g. fopen, fclose, fseek, fsync, etc.) which most any application may write to, so it is simple to interface iDataplex to it. A UPI which is associated with the recording of a certain program may be created. Also, some ordinal number associated with a given instance of that recording (e.g. Instance Number) may be tracked. Alternatively, the file pointer or location where the instance is stored may be tracked instead of instance number. All association between a user identifier and a recording's unique instance identifier may be managed through an external table, such as the type shown in FIG. 4. If the location is the instance number, then it is exactly as shown in FIG. 4. If some ordinal instance number is tracked, then in addition to the pair described (user ID and file pointer) in FIG. 4, then there may be a third field associated with each recording. Also, the information may be considered an array associated with the pairing of a given recording and a given user which may have one or more additional fields. Since the table with an array for each recording is maintained away from the tape itself, it may be updated electronically to reflect ownership changes associated with "data-less" file transfers as recordings are HSM'd from disk to tape or vice versa. If so, then a "data-less" HSM movement to or from tape may be accomplished without requiring any tape cartridge to actually be mounted or updated.

In one embodiment, just before a program begins to be broadcast by a provider, such as a cable or satellite provider, an assessment is made of the number of users who elected to record it (R), with an R of 0 indicating that no recording is to be made. In addition, the unique identity of each user is also recorded (e.g. in Subs_List_X).

One particular embodiment uses some number of sufficient spares (S) to assure that all of the R users will be able to view the program they recorded, even in the event of up to S disk failures.

Once the recording is actually complete, then this embodiment of the system has R+S copies of the recording on disk, which is sufficient to satisfy the maximum number of simultaneous viewings that may reasonably be expected from a prudence point of view, i.e. even accounting for a larger than normal set of simultaneous viewers and failures. This is something that may be determined by looking at real RS-DVR viewing statistics over tune and interpolating efficient solutions based on past usage.

A lot of the control of the HSM flow may be done by moving files between lists while monitoring the number of items in each of those lists. Imagine that rather than one Subs_List_X, 5 lists are tracking that information, one for each major usage: (1) Disk_Viewing_X which is tracking recordings on disk which are being accessed by a user; (2) Disk_Owned_X which is tracking recordings on disk which are owned by a user, but not presently being accessed; (3) Disk_Spare_X which is tracking the redundant copies on disk which may be used should a HDD holding a user owned recording of program X fail; (4) Tape_Owned_X which is tracking recordings on tape which are owned by a user; and (5) Tape_Spare_X which is tracking the redundant copies on tape which may be used should a tape holding a user owned recording fail.

Before recording, assume there is one array of information (that array could be the user recording pair referred to above or it could contain more than 2 pieces of information per recording) created in Disk_Owned_X for each user, and it has a pointer for the file opened to record program X for that user. Note that should a user elect to start viewing his recording while it is still recording, then the array of information associated with that user and recording is moved from the Disk_Owned_X to Disk_Viewing_X list, in one embodiment.

Similarly there is one array for each spare created on disk for redundancy in parallel with the user owned recordings, in another embodiment.

After recording, the HSM control may see all the completed recordings in Disk_Active_X as idle recordings that represent a cost savings opportunity, and so HSM movement may begin moving those to tape, creating the pre-migrated copy for each of them. Typically, though, there may be a maximum number of simultaneous HSM movements that may be performed and so perhaps not all Disk_Active_X recordings may be HSM'd simultaneously, but instead may be moved in batch operations over time.

In one approach, once a complete pre-migrated copy exists on tape, the migration may be expeditiously completed. The entry associated with that user's recording on disk is moved from Disk_Active_X to Disk_Spare_X. And an entry is created for that user's recording on tape in Tape_Owned_X. When these steps are complete, the movement of that user's recording from disk to tape has been completed. HSM movement continues as long as there are additional entries in Disk_Active_X to be moved to tape.

At any point in this process, a user who is viewing a recording may discontinue viewing (e.g. push Stop and exit from the play menu for that recording) and at that point the array associated with that user's recording may be moved from Disk_Viewing_X to Disk_Active_X and become a candidate for HSM movement to tape, in one approach.

At any point in this process, a user who was not viewing the saved recording may elect to start viewing the recording. There are many ways in which this may happen. Two exemplary ways are described below, depending on where the recording is located.

In a first embodiment, if the array associated with the saved recording is in Disk_Active_X, it is moved to Disk_Viewing_X, thereby enabling playback.

In a second embodiment, if the array associated with the recording is in Tape_Active_X, it is first moved from disk to tape. This is achieved via a "data-less" file movement, as previously described. Any element in Disk_Spare_X may be viewed as an orphaned recording of program X which may be adopted. Once that orphaned recording is identified, it is taken off the Disk_Spare_X list and instead becomes the pre-migrated copy of that user's recording on disk. The migration is then completed by moving the entry associated with that user's recording on tape from Tape_Active_X to Tape_Spare_X. Also, an entry is created for that user's recording on disk in Disk_Viewing_X. When these steps are complete (and all of this manipulation of data structure in memory may occur in less than a second), the movement of that user's recording from tape to disk has been completed, according to one approach.

At any point in this process, a user who owns a recording may elect to delete the recording. The deleted recording becomes a spare, and if the recording was in Disk_Viewing_X or Disk_Active_X, it is moved to Disk_Spare_X. If the recording was in Tape_Active_X, it is moved to Tape_Spare_X.

In all of the steps above, the number of recordings was either increased or preserved, but never reduced. However, one purpose of HSM movement is to lower the cost of storage, which means that at some point the number of recordings on disk should be reduced or not further increased. The HSM process, in one embodiment, monitors the total number of recordings on disk (i.e. the total number in the three lists Disk_Viewing_X, Disk_Active_X, and Disk_Spare_X). Also, it makes an assessment of the total number of recordings on disk to efficiently provide access to all users desiring access. There may be a lower bound, e.g. all the recordings associated with Disk_Viewing_X must be maintained on disk. Aside from the number to be kept on disk for viewing purposes, some number of recordings may be kept on disk as spares to replace any recordings on disk that fail. This value of spares may be determined periodically or constantly, in order to ensure no user's requests make use of a recording on tape that must be moved to disk.

An upper bound is the total number of users who have kept the recording (i.e. have not deleted the recording). For a large number of kept recordings of a given program X, it seems exceptionally unlikely probabilistically that this bound would ever be approached. Instead, user viewing history might show that only some fraction of the number of user recordings may be kept on disk, and that may potentially satisfy all the simultaneous viewers one may reasonably expect to see with high probability. Aside from the prudent number of recordings to keep on disk for viewing (even accounting for a future surge) and the number of spares that are used to protect against loss or corruption of one of those recordings on disk, all of the other recordings on disk may be moved to tape and truly freed on disk. Traditionally, these recordings would be truly freed on disk when they are irrevocably put into a list of available extents for overwrite. At that point, they would no longer be tracked as orphaned recordings which may be adopted, but rather just available disk space. That said, it may be possible to track freed but as yet unused recordings for possible adoption, should that be necessary (e.g. if a surge of viewers exceeds the allowed contingency provided in Disk_Active_X and Disk_Spare_X).

These concepts are illustrated by example in Table 1, below. Note that by time T20 that there are forty users who have kept a recording (i.e. have not deleted it), but only seven of those forty are determined to be kept on disk. The other 33 are on tape. Note that 96 recordings that had been created on disk initially have been freed for overwrite. Similarly, 17 of the copies on tape are freed. In the case of tape, that empty space is entrapped within the serial write stream, but may be reclaimed at some point in the future when that cartridge's still valid contents are rewritten to another tape and the original cartridge is then freed for complete overwrite (which is referred to as being put into the scratch pool).

TABLE 1

| | Timepoint | | | | | | | |
|---|---|---|---|---|---|---|---|---|
| | T1 | T2 | T3 | T4 | T5 | T6 | T7 | T20 |
| | | | | Comment | | | | |
| | While Recording | Recording Complete | After 1st HSM | After 2nd HSM | After 3rd HSM | After 4th HSM | After 5th HSM | After 18th HSM |
| Recordings Kept (K) | 100 (R) | 98 | 95 | 90 | 80 | 71 | 63 | 40 |
| Spare Recordings Needed (S) | 3 | 3 | 3 | 3 | 2 | 2 | 2 | 2 |

TABLE 1-continued

| | Timepoint | | | | | | |
|---|---|---|---|---|---|---|---|
| T1 | T2 | T3 | T4 | T5 | T6 | T7 | T20 |
| | | | Comment | | | | |
| While Recording | Recording Complete | After 1st HSM | After 2nd HSM | After 3rd HSM | After 4th HSM | After 5th HSM | After 18th HSM |

| | T1 | T2 | T3 | T4 | T5 | T6 | T7 | T20 |
|---|---|---|---|---|---|---|---|---|
| Copies Kept Prudently (P) | 103 | 101 | 90 | 68 | 50 | 25 | 15 | 7 |
| Viewers (V) | 80 | 76 | 45 | 30 | 20 | 10 | 6 | 2 |
| Unused Disk Copies (W) | 23 | 25 | 45 | 40 | 36 | 21 | 9 | 5 |
| Orphaned (Free) Disk Copies | 0 | 2/27 | 13/58 | 33/73 | 47/83 | 72/93 | 88/97 | 96/101 |
| User Copies on Tape (X) | 0 | 0 | 5 | 20 | 30 | 40 | 45 | 33 |
| Spare Copies on Tape (Y) | 0 | 0 | 5 | 0 | 0 | 0 | 5 | 17 |
| Copies undergoing HSM (disk-tape) | 0 | 10 | 10 | 10 | 10 | 10 | 0 | 0 |
| Tape copies free for reclamation | 0 | 0 | 0 | 0 | 0 | 0 | 4/5 | 13/15 |

One aspect of tape storage that may increase is the need to reclaim lost space as data gets invalidated—something called reclamation processing. For example, a tape which was originally filled with valid data might at some future point in time only include 40% valid data, because 60% of the data has expired or is unwanted. In one embodiment, spares could be targeted to copies on a specific cartridge. In another embodiment, any valid recordings may be moved from a given cartridge to be emptied to another cartridge which is to be retained. So if tape cartridge C has only seven remaining valid recordings (that are not on the spare list), for example at 50 GB each, and tape cartridge D has nine orphaned recordings, the seven valid recordings on cartridge C may be moved via "data-less" transfer to cartridge D. This has emptied cartridge C so it may become a "spare" cartridge and may effectively be rewritten from the start of that cartridge.

As discussed above, HSM movement of identical recordings of some program to tape may be achieved by standard transfer of the first such recording (file) and then transferring all subsequent copies of that recording via "data-less" movements. But a tape drive may have limited buffer storage and limited intelligence. So while a tape drive may conceivably be used as the target of some "data-less" transfer under some circumstances (e.g. a manufacturing write function may implement a special case of this for a relatively small amount of data), it may not be able to handle the general case (e.g. very large files that exceed the size of the tape drive buffer). In an alternative embodiment employing LTFS as the HSM engine, a next copy of that same file may be transferred from iDataplex to LTFS via the "data-less" file transfer method discussed above. In yet another embodiment, LTFS may receive a file (recording) once, yet writes the file to tape a predetermined number of times. Note that in some environments, this may create a potential problem; however, in some cases, use of the "atomic swap" method may address this problem. That is, if N copies are made on tape, but at first none of those N copies are owned, they are simply pre-migrated copies. Then, using the "atomic swap" technique described previously, there is a point in time beyond which all of those N copies on tape are owned. Simultaneously, N copies on disk are abandoned (not orphaned, but irretrievably freed to be overwritten). Thus, embodiments using LTFS as an intermediary are capable of dramatically reducing the bandwidth that iDataplex needs to provide to allow HSM movement.

One upper interface to LTFS used today is POSIX. In one embodiment, a modified POSIX may enable an application to do "data-less" file transfers by extending the upper POSIX interface so that it supports all the standard POSIX commands in addition to an extended command or two which enables "data-less" file copies to be created. For example, if in addition to the standard POSIX commands (e.g. fopen, fclose, fseek, etc.), if LTFS also supports a new fclone command to create another copy of a file (e.g. perhaps the previous file, or perhaps by providing a file pointer to the previous file), then the POSIX API may have been sufficiently extended enough to enable multiple simultaneous file transfers.

In yet another embodiment, a recording is not stored as one big file but rather as a linked set of files of shorter length. As an example, the shorter files might have 10 minutes of video in length or any other length. In this example, a 30 minute recording is a set of 3 of those 10 minute files linked together. Also, a 3 hour recording might be a set of 18 of those 10 minute files linked together. Note that once the first two 10 minute segments of a show have been accessed and traversed, the viewer is apparently viewing the third segment, the probability of that viewer later deleting that first segment without ever viewing it again is very high.

Because of this tendency, HSM to tape of the first 10 minutes of a recording as soon as a sufficient number of users have already seen it and are now viewing the 3rd 10 minute segment may begin aggressively. This assumes there is sufficient bandwidth to do so—but even this may be essentially facilitated by rotating the assignment of which drives are storing the spare segments. If the third segment is being stored to different HDDs than the first segment, then the HDDs being used to store the first segment may be available—and thus have bandwidth so they may participate in HSM migration.

This potentially allows for more HSM to tape, and so relies on even less data on disk, which further helps reduce costs. For example, if complete recordings are being kept, then perhaps 100 full recordings are kept on disk, because there could conceivably be a rush of up to nearly 100 viewers simultaneously replaying at least a portion of that program. But the chances of all 100 starting simultaneously (e.g. to within 10 minutes) is probably small, at least for a long program (e.g. 2 hours). Therefore, the system might be able to store only six copies of each segment on disk instead.

Note that during programming of recording-long exceptions (e.g. recordings to start sooner, end later, etc.) when segments are not involved, then the whole specialized recording is very likely a unique operation. However, assume a "normal" 2 hour program is recorded as segments B, C, D, E, F, and G. Starting that recording 5 minutes early results in a partial segment, referred to here as A', which might be unique to that one user. Similarly, recording that program for longer might result in a partial segment, referred to here as H', which might be unique to that one user. Because A' and H' may be dealt with separately for that unique user, while leaving all the other segments (B thru G) common with users that performed a standard length recording, it allows for treating the bulk of the recording as a part of a much larger pool of recordings which enables "data-less" segment file moves (e.g. as part of HSM).

The same problem may exist in reverse for recording-short exceptions (e.g. recordings to start later, end sooner, etc.). In that case, the first and last segments may be anomalous to giving B' and G'.

An alternative to storing special length segments (e.g. A', B', G', or H' in the two examples above) is to simply store the full 10-minute segments (i.e. A, B, G, and H) as well as a pointer which indicates where a given user may view the associated segment. For example, if each segment has an associated start pointer, then in the case of A' and B', the start pointer may be non-zero indicating that some number of the first minutes of that segment have to be skipped over transparently, so that to the user they are not even there. Assume that each segment also has an associated stop pointer. In the case of G' and H' the stop pointer would be pointed somewhere before the end of the 10-minute segment, indicating that some number of the final minutes of that segment are to be skipped over transparently, so that to the user they are not even there. Use of start and stop pointers may allow all recordings to be comprised of some integer number of linked equal-length recorded segments, in one approach. All segments might be exactly 10-minutes long (per the example above), or some other length (e.g. 1 second, 1 minute, 5 minutes, 30 seconds, etc.) if that proves to be more optimal from a system point of view).

Today's tape drives provide the lowest cost form of enterprise class storage, yet still have challenges. The biggest single challenge is access time. Random access to a file on tape may take 1 to 2 minutes or more if that tape is not presently mounted (e.g. 5-10 seconds to mount, 15 seconds to load/thread, and up to 90 seconds to seek to the start of a file)—and a user may not be willing to wait 2 minutes to start playing back a recording. Also, tape data rates between tape generations have sometimes increased less than the increase in capacity between generations (e.g. in LTO-4 vs LTO-3, or LTO-5 vs LTO-4) which increases the cartridge fill time.

The continuing near-geometric growth in storage device capacity would require a commensurate increase in drive data rate to keep the fill time constant, but increasing the data rate can sometimes unacceptably increase the drive cost. But, if one may implement along all of the lines argued for above when implementing a storage solution for RS-DVR, which results in "data-less" file transfers from tape to disk, then this allows all primary issues with tape to be overcome—and the lowest cost form of storage is made available for use. Neither fill time nor access time is an issue, both are just dealt with transparently as part of a background process.

Using the techniques described herein according to various embodiments, a substantially lower cost RS-DVR solution may be constructed which stores a significant fraction of users' recordings on tape, yet achieves acceptable performance.

Figure 7:
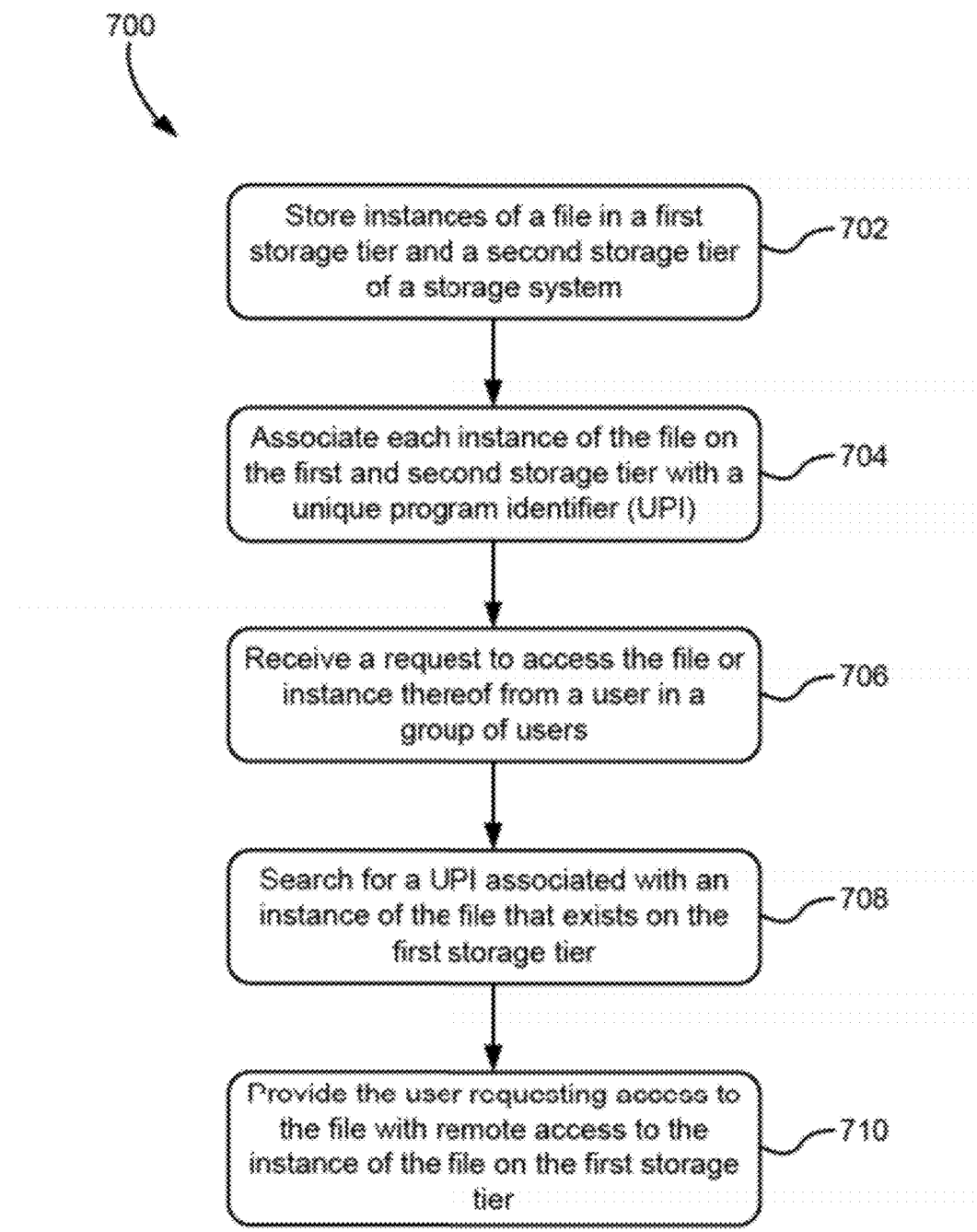
FIG. 7 shows a flowchart of a method, according to one embodiment.

Now referring to FIG. 7, a method 700 is shown according to one embodiment. The method 700 may be carried out in any desired environment, including but not limited to, those shown in FIGS. 1-6, according to various embodiments. Of course, the method 700 may include more or less operations than those described below, and shown in FIG. 7, as would be known to one of skill in the art.

In one preferred embodiment, the operations in FIG. 7 may be carried out by a storage system manager, as described previously.

In operation 702, instances of a file are stored in a first storage tier and a second storage tier of a storage system. Of course, initially, it is not required that instances be stored in both tiers of the storage system, but at least one instance of the file is stored in the storage system.

In operation 704, each instance of the file on the first and second storage tier is associated with a UPI, which may be of any format or construction as would be apparent to one of skill in the art upon reading the present descriptions.

In operation 706, a request to access the file or instance thereof is received from a user in a group of users. The group of users may be a group which are allowed to request access to files in the storage system, may be a subset thereof, or any other group of users as would be apparent to one of skill in the art upon reading the present descriptions.

In operation 708, a UPI associated with an instance of the file that exists on the first storage tier is searched for. A search which returns instances having this UPI indicates that these returned instances includes a collection of data common to the file which the user is requesting access to.

In operation 710, the user requesting access to the file is provided with remote access to the instance of the file on the first storage tier. This access may be an ability to view a video file, an ability to download the instance of the file, streaming the instance of the file to a user's device, or any other method of providing access as would be apparent to one of skill in the art upon reading the present descriptions.

In one embodiment, the file may include video data from a television broadcast or any other video data as previously described.

In more approaches, the method 700 may include setting a UPI associated with an instance of the file to null or marked as modified if data in the instance of the file is manipulated in any way, as previously described. This ensures that each individual UPI is actually associated with a common collection of data.

In another approach, the method may include associating each user within the group of users to a unique user identifier and storing the association in a first index, associating each instance of the file on the storage system to a subset of users within the group of users via the unique user identifiers and storing the association in a second index, and associating each instance of the file on the storage system to one usage status related to usage of the instance of the file and storing the association in a third index.

In a further embodiment, the first index, the second index, and the third index may be markup language index files.

In another embodiment, when the instance of the file that exists on the first storage tier is associated with a second user in the group of users and is not being accessed by the second user, the method 700 may include setting an ownership status of the instance of the file on the first storage tier to owned by the first user, setting an ownership status of an unused instance of the file on the second storage tier from owned by the first user to owned by the second user, and providing the first user with remote access to the instance of the file on the first storage tier.

According to another approach, the first storage tier of the storage system may include at least one'random access storage medium, which includes magnetic disk media. Further, the second storage tier of the storage system may include at least one sequential access storage medium, which includes magnetic tape media.

In another embodiment, the method 700 described above may be implemented in a computer program product for managing a storage system. For example, the computer program product may include a computer readable storage medium having computer readable program code embodied therewith, the computer readable program code comprising computer readable program code configured to store instances of a file in a first storage tier and a second storage tier of a storage system, computer readable program code configured to associate each instance of the file on the first and second storage tier with a UPI, computer readable program code configured to receive a request to access the file or instance thereof from a first user in a group of users, computer readable program code configured to search for a UPI associated with an instance of the file that exists on the first storage tier, (when the instance of the file that exists on the first storage tier is associated-with a second user in the group of users and is not being accessed by the second user: computer readable program code configured to set an ownership status of the instance of the file on the first storage tier to owned by the first user, computer readable program code configured to set an ownership status of an unused instance of the file on the second storage tier from owned by the first user to owned by the second user), and computer readable program code configured to provide the first user with remote access to the instance of the file on the first storage tier.

In another embodiment, the computer program product may also include computer readable program code configured to set a UPI associated with an instance of the file to null or marked as modified if data in the instance of the file is manipulated in any way.

The computer program product may include any of the embodiments described above as well, as would be apparent to one of skill in the art upon reading the present descriptions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
   storing instances of a file in a first storage tier and a second storage tier of a storage system;
   associating each instance of the file on the first and second storage tier with a unique program identifier (UPI), wherein multiple instances which include a common collection of data are associated with a common UPI;
   receiving a request to access the file or instance thereof from a user in a group of users;
   searching for a UPI associated with an instance of the file that exists on the first storage tier; and
   providing the user requesting access to the file with remote access to the instance of the file on the first storage tier, wherein providing the user with remote access to the instance of the file on the first storage tier includes providing the remote access only when the instance of the file that exists on the first storage tier is not being used by any other user in the group of users.

2. The method as recited in claim 1, wherein the file and instances thereof include video data recorded from a broadcast.

3. The method as recited in claim 1, further comprising setting a UPI associated with an instance of the file to null or marked as modified if data in the instance of the file is manipulated in any way.

4. The method as recited in claim 1, wherein the second storage tier uses less expensive and/or slower-to-access storage media than the first storage tier.

5. The method as recited in claim 1, wherein the instance of the file that exists on the first storage tier is associated with a second user in the group of users and is not being accessed by the second user, and further comprising:
   setting an ownership status of the instance of the file on the first storage tier to owned by the user requesting access to the file; and
   setting an ownership status of an unused instance of the file on the second storage tier from owned by the user requesting access to the file to owned by the second user.

6. The method as recited in claim 5, further comprising:
   associating each user in the group of users with a unique user identifier and storing the association in a first index;
   associating each instance of the file on the storage system with a unique user in the group of users via the unique user identifiers and storing the association in a second index; and
   associating each instance of the file on the storage system to one usage status related to usage of the instance of the file and storing the association in a third index.

7. A method, comprising:
   storing instances of a file in a first storage tier and a second storage tier of a storage system;
   associating each instance of the file on the first and second storage tier with a unique program identifier (UPI);
   receiving a request to access the file or instance thereof from a first user in a group of users;
   searching for a UPI associated with an instance of the file that exists on the first storage tier in response to the request;
   when the instance of the file found by the searching and that exists on the first storage tier is associated with a second user in the group of users and is not being accessed by the second user:
      setting an ownership status of the instance of the file on the first storage tier to owned by the first user; and
      setting an ownership status of an unused instance of the file on the second storage tier from owned by the first user to owned by the second user;
   providing the first user with remote access to the instance of the file on the first storage tier;
   determining when to migrate the instance of the file owned by the user requesting access from the first storage tier to the second storage tier;
   searching for an instance of the file or portion thereof on the second storage tier that is not owned by any user;
   setting an ownership status of the instance of the file or portion thereof on the second storage tier with the user requesting access;
   disassociating the instance of the file on the first storage tier from the first user;
   associating each user in the group of users with a unique user identifier and storing the association in a first index;

associating each instance of the file on the storage system with a unique user in the group of users via the unique user identifiers and storing the association in a second index; and associating each instance of the file on the storage system to one usage status related to usage of the instance of the file and storing the association in a third index.

8. The method as recited in claim 7, wherein the file and instances thereof include video data from a broadcast.

9. The method as recited in claim 7, further comprising setting a UPI associated with an instance of the file to null or marked as modified if data in the instance of the file is manipulated in any way.

10. The method as recited in claim 7, wherein the second storage tier uses less expensive and/or slower-to-access storage media than the first storage tier.

11. The method as recited in claim 7, wherein multiple instances which include a common collection of data are associated with a common UPI.

12. A method, comprising:

storing instances of a file in a first storage tier and a second storage tier of a storage system;

associating each instance of the file on the first and second storage tier with a unique program identifier (UPI), wherein multiple instances which include a common collection of data are associated with a common UPI;

receiving a request to access the file or instance thereof from a user in a group of users;

searching for a UPI associated with an instance of the file that exists on the first storage tier;

providing the user requesting access to the file with remote access to the instance of the file on the first storage tier;

selecting which of a plurality of instances of the file in the first storage tier are to be migrated to the second storage tier; and copying the selected instance of the file from the first storage tier or an intermediate storage tier to the second storage tier for creating multiple instances of the file on the second storage tier thereby creating a unique instance of the file on the second storage tier for each instance of the file on the first storage tier that is to be migrated to the second storage tier, wherein the logic for determining includes determining which instances of the file on the first storage tier have not been accessed by any user associated therewith for a predetermined period of time.

13. A storage system, comprising:

a first storage tier;

a second storage tier, wherein the second storage tier uses less expensive and/or slower-to-access storage media than the first storage tier;

logic for storing instances of a file in the first storage tier and the second storage tier;

logic for associating each instance of the file on the first and second storage tier with a unique program identifier (UPI), wherein multiple instances which include a common collection of data are associated with a common UPI;

logic for receiving a request to access the file or instance thereof from a user in a group of users;

logic for searching for a UPI associated with an instance of the file that exists on the first storage tier; and logic for providing the user requesting access to the file with remote access to the instance of the file on the first storage tier.

14. The storage system as recited in claim 13, wherein the file and instances thereof include video data recorded from a broadcast.

15. The storage system as recited in claim 13, wherein the logic for providing the user with remote access to the instance of the file on the first storage tier is configured to provide the remote access only when the instance of the file that exists on the first storage tier is not being used by any other user in the group of users.

16. The storage system as recited in claim 13, wherein the instance of the file that exists on the first storage tier is associated with a second user in the group of users and is not being accessed by the second user, and further comprising:

logic for setting an ownership status of the instance of the file on the first storage tier to owned by the user requesting access to the file; and logic for setting an ownership status of an unused instance of the file on the second storage tier from owned by the user requesting access to the file to owned by the second user.

17. The storage system as recited in claim 16, further comprising:

logic for associating each user in the group of users with a unique user identifier and storing the association in a first index;

logic for associating each instance of the file on the storage system with a unique user in the group of users via the unique user identifiers and storing the association in a second index; and logic for associating each instance of the file on the storage system to one usage status related to usage of the instance of the file and storing the association in a third index.

18. The storage system as recited in claim 16, further comprising:

logic for determining when to migrate the instance of the file owned by the user requesting access from the first storage tier to the second storage tier;

logic for searching for an instance of the file or portion thereof on the second storage tier that is not owned by any user;

logic for setting an ownership status of the instance of the file or portion thereof on the second storage tier with the user requesting access; and logic for disassociating the instance of the tile on the first storage tier from the first user.

19. The storage system as recited in claim 13, wherein the first storage tier includes at least one random access storage medium, and wherein the second storage tier includes at least one sequential access storage medium.

20. The storage system as recited in claim 13, wherein the UPI is protected by a file system of the storage system such that any manipulation of data in an instance of the file associated with the UPI causes the UPI to be set to a null value or marked as modified.

21. The storage system as recited in claim 13, further comprising logic for storing the association of the UPI to each instance of the file in an index.

22. The storage system as recited in claim 13, further comprising logic for storing the UPI to metadata associated with each instance of the file.

23. The storage system as recited in claim 13, further comprising:

logic for determining when to migrate an instance of the file associated with a first user and stored on the first storage tier to the second storage tier;

logic for searching for an instance of the file or portion thereof on the second storage tier that is not associated with any user;

logic for associating the instance of the file or portion thereof on the second storage tier with the first user; and logic for disassociating the instance of the file on the first storage tier from the first user.

24. The storage system as recited in claim 13, further comprising:

logic for selecting which of a plurality of instances of the file in the first storage tier are to be migrated to the second storage tier;

logic for copying the selected instance of the file from the first storage tier or an intermediate storage tier to the second storage tier for creating multiple instances of the file on the second storage tier thereby creating a unique instance of the file on the second storage tier for each instance of the file on the first storage tier that is to be migrated to the second storage tier, wherein the logic for determining includes determining which instances of the file on the first storage tier have not been accessed by any user associated therewith for a predetermined period of time.

25. A storage system, comprising:

a first storage tier;

a second storage tier;

logic for storing instances of a file in the first storage tier and the second storage tier;

logic for associating each instance of the file on the first and second storage tier with a unique program identifier (UPI);

logic for receiving a request to access the file or instance thereof from a first user in a group of users;

logic for searching for a UPI associated with an instance of the file that exists on the first storage tier;

logic for setting an ownership status of the instance of the file on the first storage tier to owned by the first user when the instance of the file that exists on the first storage tier is associated with a second user in the group of users and is not being accessed by the second user;

logic for setting an ownership status of an unused instance of the file on the second storage tier from owned by the first user to owned by the second user when the instance of the file that exists on the first storage tier is associated with the second user in the group of users and is not being accessed by the second user; and logic for providing the first user with remote access to the instance of the file on the first storage tier.

26. The storage system as recited in claim 25, wherein any instance of the file is capable of being owned by no more than one user at a time.

27. The storage system as recited in claim 25, wherein the instance of the file that exists on the first storage tier is not being used by any other user in the group of users.

28. The storage system as recited in claim 25, wherein the first storage tier includes at least one random access storage medium, and wherein the second storage tier includes at least one sequential access storage medium.

29. The storage system as recited in claim 25, wherein the UPI is protected by a file system of the storage system such that any manipulation of data in an instance of the file associated with the UPI causes the UPI to be set to a null value or marked as modified.

30. The storage system as recited in claim 25, wherein multiple instances which are associated to a common UPI include a common collection of data.

31. The storage system as recited in claim 25, further comprising logic for storing the association of the UPI to each instance of the file in an index.

32. The storage system as recited in claim 25, further comprising logic for storing the UPI to metadata associated with each instance of the file.

33. The storage system as recited in claim 25, further comprising:

logic for determining when to migrate the instance of the file owned by the user requesting access from the first storage tier to the second storage tier;

logic for searching for an instance of the file or portion thereof on the second storage tier that is not owned by any user;

logic for setting an ownership status of the instance of the tile or portion thereof on the second storage tier with the user requesting access; and logic for disassociating the instance of the file on the first storage tier from the first user.

34. The storage system as recited in claim 33, further comprising:

logic for associating each user in the group of users with a unique user identifier and storing the association in a first index;

logic for associating each instance of the file on the storage system with a unique user in the group of users via the unique user identifiers and storing the association in a second index; and logic for associating each instance of the file on the storage system to one usage status related to usage of the instance of the file and storing the association in a third index.

35. The storage system as recited in claim 25, further comprising:

logic for selecting which of a plurality of instances of the file in the first storage tier are to be migrated to the second storage tier;

logic for copying the selected instance of the file from the first storage tier or an intermediate storage tier to the second storage tier for creating multiple instances of the file on the second storage tier thereby creating a unique instance of the file on the second storage tier for each instance of the file on the first storage tier that is to be migrated to the second storage tier, wherein the logic for determining includes determining which instances of the file on the first storage tier have not been accessed by any user associated therewith for a predetermined period of time.

36. A computer program product for managing a storage system, the computer program product comprising:

a non-transitory computer readable storage medium having computer readable program code embodied therewith, the computer readable program code comprising:

computer readable program code configured to store instances of a file in a first storage tier and a second storage tier of a storage system;

computer readable program code configured to associate each instance of the file on the first and second storage tier with a unique program identifier (UPI);

computer readable program code configured to receive a request to access the file or instance thereof from a first user in a group of users;

computer readable program code configured to search for a UPI associated with an instance of the file that exists on the first storage tier;

computer readable program code configured to set an ownership status of the instance of the file on the first storage tier to owned by the first user when the instance of the file that exists on the first storage tier is associated with a second user in the group of users and is not being accessed by the second user;

computer readable program code configured to set an ownership status of an unused instance of the file on the second storage tier from owned by the first user to owned by the second user when the instance of the file that exists on the first storage tier is associated with the second user in the group of users and is not being accessed by the second user; and computer readable program code configured to provide the first user with remote access to the instance of the file on the first storage tier.

37. The computer program product as recited in claim 36, further comprising computer readable program code configured to set a UPI associated with an instance of the file to null if data in the instance of the file is manipulated in any way.

* * * * *